US012645274B2

(12) United States Patent
Kim et al.

(10) Patent No.: US 12,645,274 B2
(45) Date of Patent: Jun. 2, 2026

(54) POWER SUPPLY AND METHOD FOR BALANCING POWER IN POWER SUPPLY

(71) Applicant: SAMSUNG ELECTRONICS CO., LTD., Suwon-si (KR)

(72) Inventors: Moonyoung Kim, Suwon-si (KR); Jeongil Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 18/497,247

(22) Filed: Oct. 30, 2023

(65) Prior Publication Data

US 2024/0061483 A1 Feb. 22, 2024

Related U.S. Application Data

(63) Continuation of application No. PCT/KR2022/005938, filed on Apr. 26, 2022.

(30) Foreign Application Priority Data

Jun. 28, 2021 (KR) ........................ 10-2021-0083885

(51) Int. Cl.
 G06F 1/26 (2006.01)
 G06F 1/18 (2026.01)
 (Continued)

(52) U.S. Cl.
 CPC .............. G06F 1/263 (2013.01); G06F 1/189 (2013.01); H01R 13/70 (2013.01); H01R 25/142 (2013.01)

(58) Field of Classification Search
 CPC .......... G06F 1/189; G06F 1/263; G06F 1/266; G06F 1/28; G06F 1/30; G06F 11/3058;
 (Continued)

(56) References Cited

U.S. PATENT DOCUMENTS 6,039,584 A * 3/2000 Ross ...................... H01R 25/14
 439/115
7,526,659 B2 4/2009 Sawyers et al.
 (Continued)

FOREIGN PATENT DOCUMENTS

EP 0725992 B1 8/1998
JP 2009159657 A 7/2009
 (Continued)

OTHER PUBLICATIONS

Korean Office Action issued Jun. 27, 2025 in corresponding Korean Patent Application No. 10-2021-0083885.
 (Continued)

*Primary Examiner* — Thomas J. Cleary
(74) *Attorney, Agent, or Firm* — Nixon & Vanderhye P.C.

(57) ABSTRACT

Various embodiments of the present disclosure relate to balancing power in a power supply. To this end, a power supply may comprise: a plurality of power supply lines configured to respectively transmit power of a plurality of voltages; a power balancing control unit comprising circuitry configured to obtain each amount of power usage for each of the plurality of power supply lines, and generate a control signal based on each of the obtained amounts of power usages; and a power balancing unit comprising circuitry configured to transform a voltage of a current drawn from a first power supply line from among the plurality of power supply lines and provide the transformed voltage to a second power supply line from among the plurality of power supply lines.

14 Claims, 36 Drawing Sheets

(51) Int. Cl.

H01R 13/70      (2006.01)

H01R 25/14      (2006.01)

(58) Field of Classification Search

CPC ......... G06F 1/1601; H01R 9/226; H01R 9/26; H01R 9/2675; H01R 13/70; H01R 24/60; H01R 25/142; H01R 2107/00; H02M 1/10; H02M 3/155; H02M 3/158; H02M 7/04; H02J 1/08; H02J 50/05

See application file for complete search history.

(56)           References Cited

U.S. PATENT DOCUMENTS

| | | | | |
|---|---|---|---|---|
| 7,893,560 | B2 * | 2/2011 | Carter | H02J 9/061 |
| | | | | 307/64 |
| 8,103,885 | B2 | 1/2012 | Sawyers et al. | |
| 8,276,006 | B2 | 9/2012 | Sawyers et al. | |
| 8,622,756 | B2 | 1/2014 | Smed | |
| 9,864,421 | B2 | 1/2018 | Li et al. | |
| 10,199,833 | B1 * | 2/2019 | Bucher | H02J 3/0073 |
| 11,506,272 | B2 * | 11/2022 | Moulin | H01R 33/94 |
| 11,923,703 | B2 * | 3/2024 | Cao | H02J 7/34 |
| 2003/0168913 | A1 * | 9/2003 | Kinnard | H02J 1/10 |
| | | | | 307/29 |
| 2011/0244715 | A1 * | 10/2011 | Aldag | H01R 25/142 |
| | | | | 439/488 |
| 2011/0286152 | A1 * | 11/2011 | Wolinsky | A47F 10/02 |
| | | | | 361/601 |
| 2015/0171665 | A1 * | 6/2015 | Humphrey | H02M 3/33584 |
| | | | | 307/64 |
| 2015/0236462 | A1 * | 8/2015 | Davidson, Jr. | H01R 25/142 |
| | | | | 439/122 |
| 2015/0288178 | A1 * | 10/2015 | Gurlahosur | H02J 1/102 |
| | | | | 307/75 |
| 2016/0308372 | A1 * | 10/2016 | Kolla | H02J 4/00 |
| 2016/0372909 | A1 * | 12/2016 | Baldwin | H02G 5/08 |
| 2017/0070016 | A1 | 3/2017 | Destro | |
| 2017/0187187 | A1 | 6/2017 | Amin et al. | |
| 2018/0031217 | A1 * | 2/2018 | Tuchler | F21V 21/04 |
| 2019/0067959 | A1 * | 2/2019 | Burden | H01M 10/4207 |
| 2019/0103766 | A1 | 4/2019 | Von Novak, III et al. | |
| 2020/0324719 | A1 * | 10/2020 | Mahmoud | H04L 12/10 |
| 2021/0281002 | A1 * | 9/2021 | Noll | H01R 4/26 |
| 2023/0168913 | A1 | 6/2023 | Yoon et al. | |
| 2024/0406014 | A1 * | 12/2024 | Tjanaka | H04L 12/10 |
| 2025/0138613 | A1 * | 5/2025 | Lopez | G06F 1/266 |

FOREIGN PATENT DOCUMENTS

| | | | |
|---|---|---|---|
| JP | 2009159728 | A | 7/2009 |
| JP | 2009-232520 | | 10/2009 |
| JP | 2010097876 | A | 4/2010 |
| JP | 5613897 | B2 | 9/2014 |
| JP | 2017520101 | A | 7/2017 |
| KR | 20040068045 | A | 7/2004 |
| KR | 200371122 | Y1 | 12/2004 |
| KR | 20070107741 | A | 11/2007 |
| KR | 100787150 | B1 | 12/2007 |
| KR | 20140005601 | U | 10/2014 |
| KR | 20150111804 | A | 10/2015 |
| KR | 20160130621 | A | 11/2016 |
| KR | 101750483 | B1 | 6/2017 |
| KR | 20180024433 | A | 3/2018 |
| KR | 101870769 | B1 | 8/2018 |
| KR | 102156890 | B1 | 9/2020 |
| KR | 20200129366 | A | 11/2020 |

OTHER PUBLICATIONS

International Search Report for PCT/KR2022/005938 mailed Aug. 10, 2022, 4 pages.

Written Opinion of the ISA for PCT/KR2022/005938, mailed Aug. 10, 2022, 5 pages.

* cited by examiner

5V CONNECTOR

20V CONNECTOR

VOLTAGE SELECTIVE CONNECTOR

1330b

POWER SUPPLY AND METHOD FOR BALANCING POWER IN POWER SUPPLY

CROSS-REFERENCE TO RELATED APPLICATIONS

This application is a continuation of International Application No. PCT/KR2022/005938 designating the United States, filed on Apr. 26, 2022, in the Korean Intellectual Property Receiving Office and claiming priority to Korean Patent Application No. 10-2021-0083885, filed on Jun. 28, 2021, in the Korean Intellectual Property Office, the disclosures of each of which are incorporated by reference herein in their entireties.

BACKGROUND

Field

The disclosure relates to a power supply, and for example, to power balancing in a power supply.

Description of Related Art

Power supplying to various electronic devices is typically provided by a power adapter that converts alternating-current (AC) power received from an external source into direct-current (DC) power and converts the DC power to a predetermined voltage. Such power adapters providing DC power may include a fixed-voltage type adapter that provides a certain fixed voltage and a variable-voltage type adapter (e.g., a USB PD standard adapter) capable of providing a variable voltage in the range of 5V to 20V in line with electronic devices to be supplied.

Both the fixed-voltage type adapter and the variable-voltage type adapter described above are based on a one-to-one power transfer mechanism, and multiple adapters have to be provided for multiple electronic devices. In particular, although a USB PD standard adapter is designed to have a power transmission capability up to 100 W, while that adapter is supplying power of a specific voltage to an electronic device at a specific time point, it may be unable to supply power to another electronic device adapted to receive power of a different voltage from the specific voltage, even if its ability to provide power still remains.

SUMMARY

Embodiments of the disclosure provide a power adapter or a power supply capable of simultaneously supplying power to a plurality of electronic devices respectively using power of a different voltage.

Embodiments of the disclosure provide a power supplying adapter having a power balancing function, with which the power supplying adapter is capable of connecting a plurality of electronic devices and freely supplying power to each of the electronic devices within a range of a total amount of power supply established with respect to the power supplying adapter, without considering each capacity for each voltage, and such a power balancing method.

According to an example embodiment of the disclosure, a power supply may comprise: a plurality of power supply lines configured to respectively transmit power of a plurality of voltages; a power balancing control unit comprising control circuitry configured to obtain each amount of power usage for each of the plurality of power supply lines and generate a control signal, based on each of the obtained amounts of power usages; and a power balancing unit comprising circuitry configured to transform, based on the control signal, a voltage of current drawn from a first power supply line of the plurality of power supply lines and provide the transformed voltage to a second power supply line of the plurality of power supply lines.

According to an example embodiment of the disclosure, a method for performing power balancing in a power supply may comprise: obtaining each amount of power usage from each of a plurality of power supply lines; based on each of the obtained amounts of power usages, determining, among the plurality of power supply lines, at least one first power supply line to provide current to another power supply line and a second power supply line to receive current from another power supply line; and controlling at least a portion of available power from each of the at least one first power supply line to be provided to the second power supply line.

A power adapter or a power supply according to various example embodiments of the disclosure may freely connect a plurality of electronic devices to adaptively supply power to each of the electronic devices, without taking into account the capacity for each voltage, within a range of a predetermined total amount of power supply.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
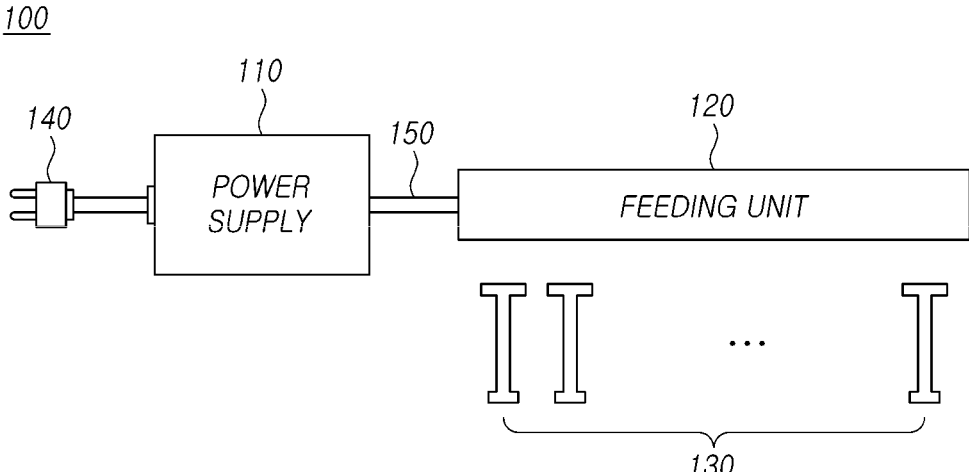
FIG. 1 is a diagram illustrating an example configuration of a power supply system according to various embodiments.

Hereinafter, various example embodiments will be described in greater detail with reference to the accompanying drawings. Throughout the following description, specific details such as example configurations and components will be provided to help a general understanding of embodiments of the disclosure. In conjunction with the description of drawings, the same or similar components may be indicated by the same or similar reference numerals. Further, in the drawings and related descriptions, descriptions of well-known features and configurations may be omitted for the sake of clarity and brevity.

FIG. 1 is a diagram illustrating an example configuration of a power supply system according to various embodiments. As illustrated, a power supply system 100 includes a power supply 110, a feeding unit (e.g., including various feed points) 120, a plurality of connectors 130, a plug 140, and a power supply line 150.

According to an embodiment of the disclosure, the power supply 110 may receive an external input power through the plug 140. According to an embodiment of the disclosure, the plug 140 may receive, for example, a commercial AC power from an outlet installed on a wall in a room. According to an embodiment of the disclosure, the plug 140 may receive a DC/AC power from various DC/AC power sources. According to an embodiment of the disclosure, the power supply 110 may appropriately convert (e.g., either AC/DC conversion or DC/DC conversion) an input power received from an outside via the plug 140 to provide power of two or more DC voltages to the feeding unit 120 via the power supply line 150.

According to an embodiment of the disclosure, the feeding unit 120 may include various feed points (e.g., comprising conductors) and receive currents of two or more DC voltages from the power supply 110, and provide the received currents of the DC voltages to the outside via each connector 130 connected to the feeding unit 120. According to an embodiment of the disclosure, the feeding unit 120 may include a plurality of electrodes configured to transmit currents of different voltages. According to an embodiment of the disclosure, each electrode of the feeding unit 120 may have an elongated shape such that, for example, the plurality of connectors 130 may be connected to the corresponding electrodes side by side, but the disclosure is not limited thereto. According to an embodiment of the disclosure, when each electrode of the feeding unit 120 is configured in an elongated form, the connectors 130 connected to the feeding unit 120 may have a certain degree of freedom at each connection position along the extending direction thereof.

Although not illustrated in the drawings, according to an embodiment of the disclosure, each of the plurality of connectors 130 may have one side configured to be connected to the corresponding electrode of the feeding unit 120 and the other side connected to an electronic device. According to an embodiment of the present disclosure, each of the plurality of connectors 130 may receive a current of a predetermined voltage from a corresponding electrode of the feeding unit 120 and provide the received current to the electronic device on the other side. According to an embodiment of the disclosure, both of one side and the other side of each connector 130 may be configured detachably, or alternatively, the other side of the connector 130 (e.g., the side connected to the electronic device) may be fixed to the corresponding electronic device. According to an embodiment of the disclosure, each of the plurality of connectors 130 may have a shape matching a shape of a corresponding electrode of the feeding unit 120 to which it is to be connected at one side thereof (e.g., the side connected to the feeding unit 120). According to embodiments of the disclosure, each of the plurality of connectors 130 may have either the same shape or different structures, and the disclosure is not limited to the connector 130 of a specific shape or structure.

According to an embodiment of the disclosure, as described above, powers of two or more DC voltages from the power supply 110 may be supplied to the feeding unit 120 through the power supply line 150. Accordingly, while the power supply line 150 is illustrated in this drawing as if it were a single conductor wire, the power supply line 150 according to an embodiment of the disclosure may include a multiplicity of power wires each configured to carry power of a respective DC voltage. According to an embodiment of the disclosure, the power supply 110 and the feeding unit 120 may be arranged to be spaced apart from each other, and in such a circumstance, the power supply line 150 may be configured to extend long to connect the two elements. According to an embodiment of the disclosure, the power supply 110 and the feeding unit 120 may be disposed adjacent to each other, in which case the power supply line 150 may be configured not exposed to the outside or to be relatively shorter.

Figure 2A:
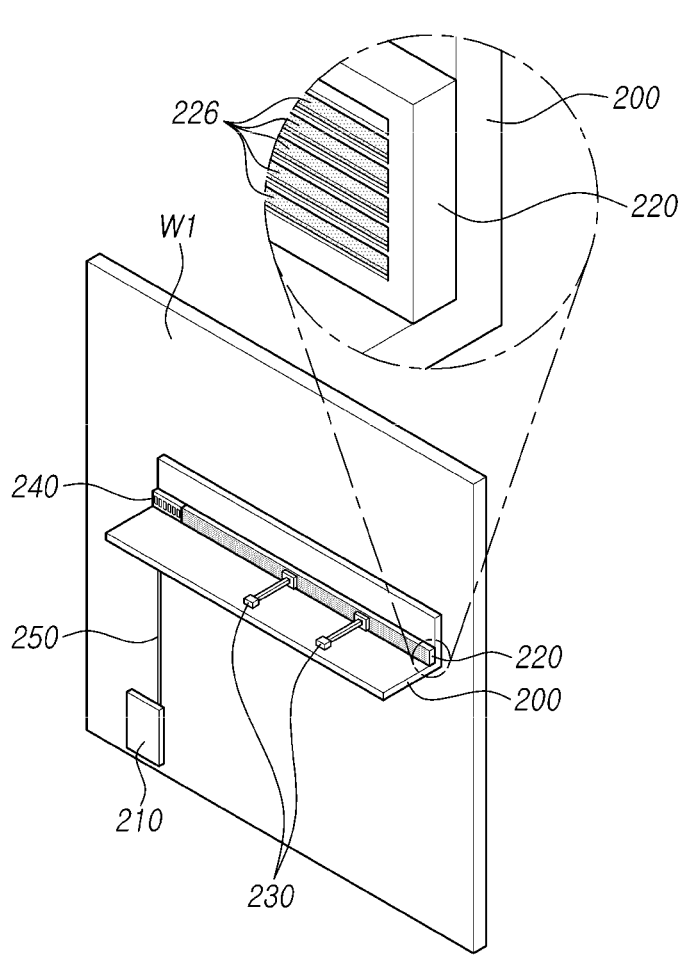
FIGS. 2A and 2B are diagrams illustrating examples of using a power supply system, according to various embodiments.
Figure 2B:
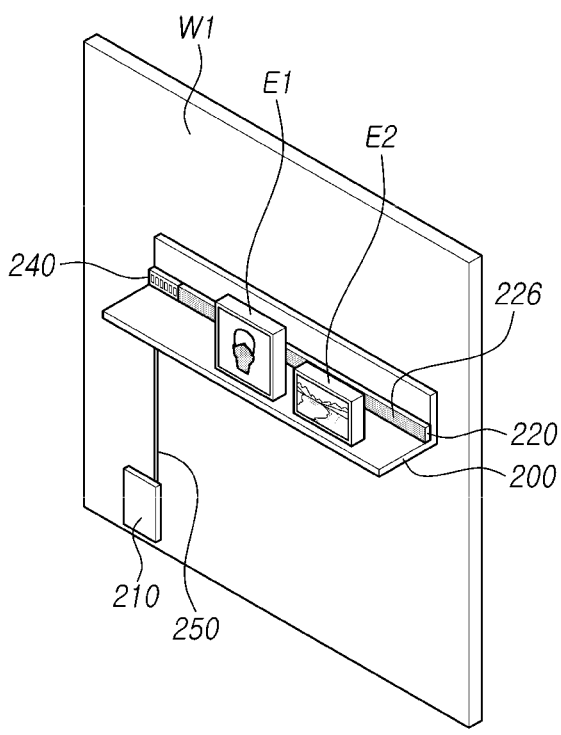

FIGS. 2A and 2B are diagrams illustrating examples of using a power supply system, according to various embodiments.

As illustrated in FIG. 2A, an L-shaped shelf 200 attached to a vertical wall surface W1 includes a vertical portion attached to the vertical wall surface W1 and a horizontal portion protruding and extending perpendicular to the vertical portion, and a feeding unit 220 is attached to the vertical portion of the L-shaped shelf 200. The L-shaped shelf 200 may be a shelf made of wood, plastic, and various other materials, although not limited to such a specific material. As illustrated, the feeding unit 220 includes a plurality of electrodes 226 having a shape elongated in the horizontal direction. According to an embodiment of the disclosure, the plurality of electrodes 226 may be electrodes that supply power of different voltages, respectively. As illustrated in the drawings, the feeding unit 220 is disposed in such a manner that the plurality of electrodes 226 are exposed to the outside side by side on the vertical portion of the L-shaped shelf 200. According to an embodiment of the disclosure, as illustrated, the feeding unit 220 may include a display unit (e.g., including a display) 240. According to an embodiment of the disclosure, the display unit 240 may display the amount of power currently used through the power supply 220 compared to the maximum amount of power provided by the power supply system. Hereinafter, a configuration of the feeding unit including the display unit will be described in greater detail below with reference to FIG. 19.

As illustrated in the drawing, a power supply 210 is attached and installed onto the vertical wall surface W1 at a position spaced apart from the L-shaped shelf 200. As illustrated, the power supply 210 is configured to be connected to the feeding unit 220 of the L-shaped shelf 200 via a power supply line 250. According to an embodiment of the disclosure, the power supply line 250 may be a transparent conductor wire or may have any other appearance that provides a specific interior effect, but the disclosure is not limited to such a particular appearance of the power supply wire. Further, according to an embodiment of the disclosure, it is to be appreciated that the power supply 210 may be disposed at any other position.

FIG. 2A illustrates that two connectors 230 are connected to the feeding unit 220, but depending on embodiments of the disclosure, a larger or smaller number of connectors may be connected to the feeding unit 220. Further, it is illustrated in this drawing that the two connectors 230 have the same shape, but each of the connectors 230 that may be connected to the feeding unit 220 may have different shapes. Although not specifically illustrated in the drawing, each of the two connectors 230 may be electrically connected to the same or different electrodes amongst the plurality of electrodes 226 of the feeding unit 220, respectively.

In FIG. 2B, it is illustrated that two electronic devices E1 and E2 (for example, electronic devices such as a lighting fixture or an electronic picture frame) disposed on the horizontal portion of the L-shaped shelf 200 are in operation. Although not visible in the drawings, each of the two electronic devices E1 and E2 may receive power from each corresponding electrode of the plurality of electrodes 226 through a connector behind each electronic device. The shape or arrangement structure of the power supply system shown in FIG. 2A and FIG. 2B is presented to help understanding of an example to which the disclosure may be applied, and the disclosure is not limited thereto.

Figure 3A:
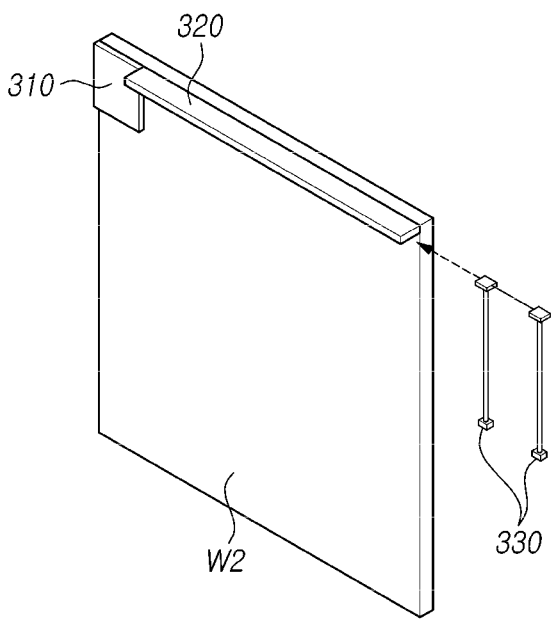
FIGS. 3A, 3B and 3C are diagrams illustrating examples of using a power supply system, according to various embodiments.
Figure 3B:
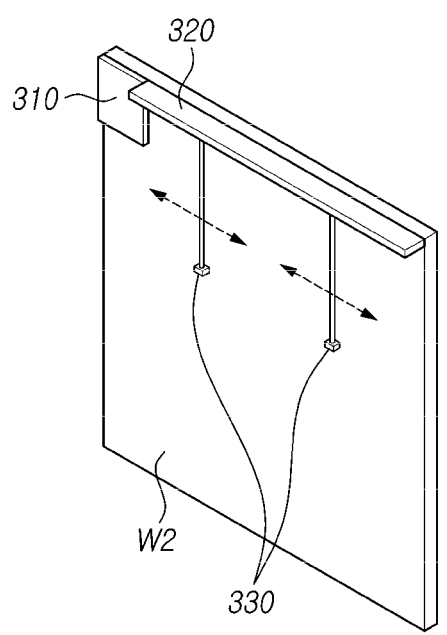
Figure 3C:
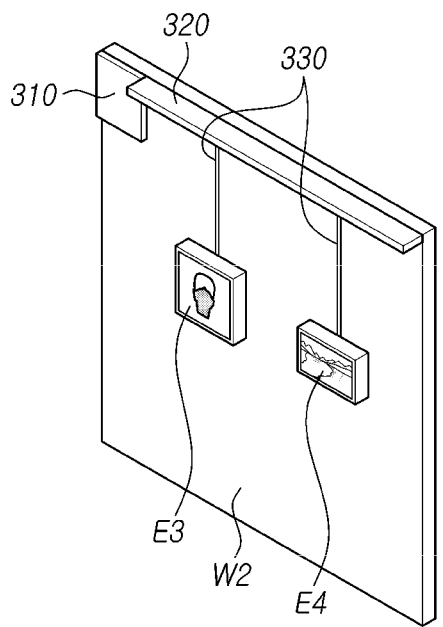

FIGS. 3A, 3B and 3C are diagrams illustrating examples of using a power supply system, according to various embodiments.

Referring to FIG. 3A, the feeding unit 320 is disposed adjacent to the upper end of the vertical wall surface W2. Although not specifically shown in the drawings, according to an embodiment of the disclosure, the feeding unit 320 may be attached to a ceiling part adjacent to and orthogonal to the uppermost end of the vertical wall surface W2. Although not specifically shown in the drawings, the feeding unit 320 may include a plurality of electrodes having a shape elongated along the horizontal direction of the vertical wall surface W2, similar to the feeding unit 220 of FIG. 2A. Further, although not specified in the drawings, according to an embodiment of the disclosure, each electrode of the feeding unit 320 may be disposed to be exposed to the outside toward the ground. While each electrode 226 of the feeding unit 220 illustrated in FIG. 2A is disposed to be exposed to the outside toward the front on the surface of the vertical wall surface W1, each electrode of the feeding unit 320 illustrated in FIGS. 3A, 3B and 3C may be disposed to be exposed to the outside vertically downward on the surface of the ceiling part perpendicular to the vertical wall surface W2.

According to an embodiment of the disclosure, the plurality of electrodes included in the feeding unit 320 of FIG. 3A may be electrodes that supply power of each voltage. As illustrated therein, the power supply unit 310 is disposed adjacent to the power supply 320. Accordingly, in FIG. 3A, any power supply line exposed to the outside is not illustrated separately, and the power supply line may be arranged as an internal connection between the power supply unit 310 and the power supply unit 320.

FIGS. 3A and 3B also show that the two connectors 330 may be disposed adjacent to the feeding unit 320 from one end of the feeding unit 320 in its extension direction, and may be horizontally moved along the extension direction of the feeding unit 320 to be positioned at a desired location. However, this configuration is merely an example embodiment of the disclosure, and according to an embodiment of the disclosure, the connector may be disposed at a desired position on the feeding unit in various ways different from those described above, when the connector is connected to the feeding unit attached to the ceiling part. Further, although two connectors 330 are illustrated in this drawing, as in the case of FIG. 2A, a larger or smaller number of connectors may be coupled to the feeding unit 320 even in the cases of FIG. 3A and FIG. 3B. Furthermore, it is illustrated in this drawing that the two connectors 330 have the same shape, but the connectors 330 may have different shapes, respectively.

In FIG. 3C, it is illustrated that two electronic devices E3 and E4 (e.g., electronic devices such as a lighting fixture or an electronic picture frame) connected through each connector 330 to the feeding unit 320 disposed on the ceiling part are in operation. Although not specifically illustrated in this drawing, each of the two connectors 330 may be electrically connected to the same or different electrode among one or more electrodes of the feeding unit 320. Although not specifically illustrated in the drawings, a physical structure for supporting connection of the connector 330 to the feeding unit 320 disposed on the ceiling part may be provided respectively in the feeding unit 320 and the connector 330, as illustrated in FIGS. 3A, 3B and 3C. The shape or arrangement structure of the power supply system illustrated in FIGS. 3A, 3B and 3C is provided to aid in understanding of a use example to which the disclosure may be applied, and the disclosure is not limited thereto. For example, according to various embodiments of the disclosure, each component of a power supply system including a power supply unit and a power supply unit may be attached to a vertical wall or a ceiling, as illustrated, or may be attached to furniture or other facilities, or may be independently disposed.

Figure 4:
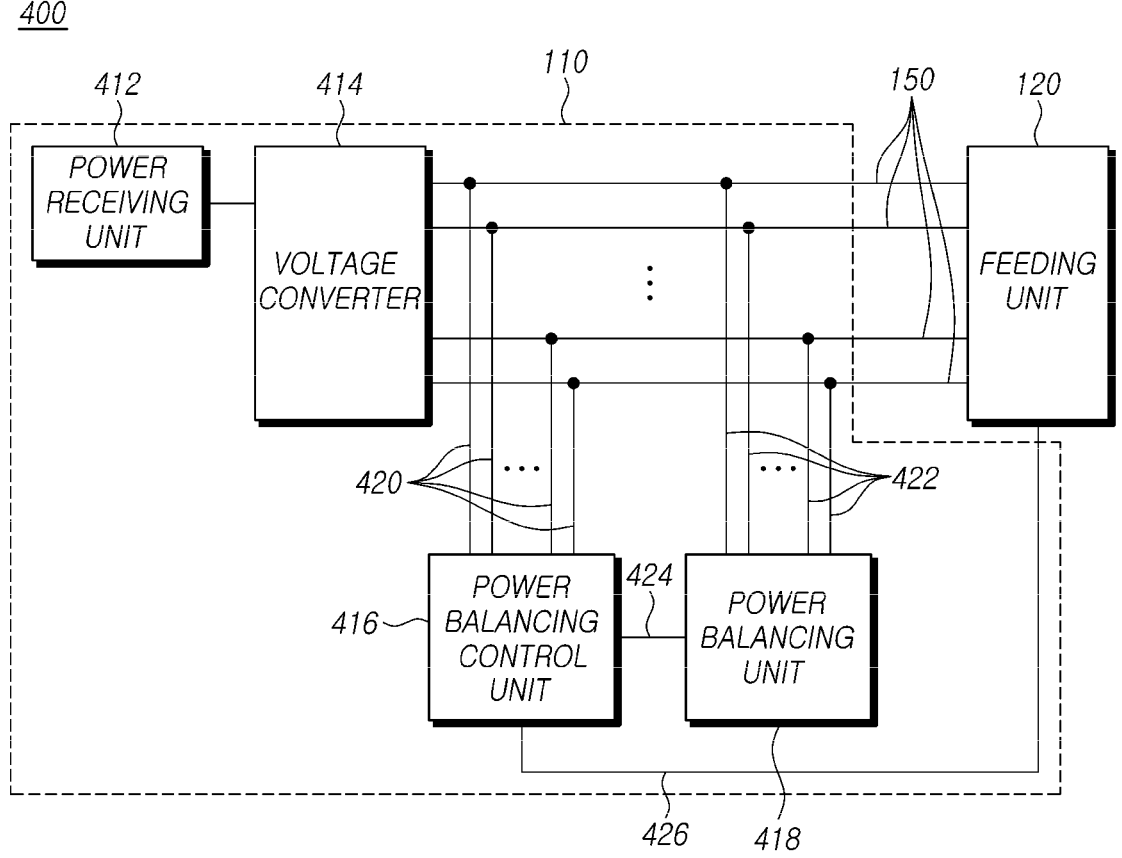
FIG. 4 is a block diagram illustrating an example configuration of a power adapter, according to various embodiments.

FIG. 4 is a block diagram illustrating an example configuration of a power adapter, according to various embodiments. As illustrated in FIG. 4, the power adapter 400 may correspond to a configuration including the power supply 110, the power supply line 150, and the feeding unit 120 as shown in FIG. 1. Referring to FIG. 4, the power supply 110 includes a power receiving unit (e.g., including power receiving circuitry) 412, a voltage converter 414, a power balancing control unit (e.g., including various control circuitry) 416, a power balancing unit (e.g., including circuitry) 418, a signal wiring 420 configured to transfer information from each of the plurality of power supply lines 150 to the power balancing control unit 416, a power wiring 422 configured to connect each of the plurality of power supply lines 150 to the power balancing unit 418, a control signal line 424 configured to transfer an operation control signal from the power balancing control unit 416 to the power balancing unit 418, and a signal line 426 to provide an information signal from the power balancing control unit 416 to the feeding unit 120.

According to an embodiment of the disclosure, the power receiving unit 412 may include various circuitry and receive input power coming into the power adapter 400, for example, through the plug 140 of FIG. 1, although not limited thereto. According to an embodiment of the disclosure, the input power may be from a commercial AC power source or from various other DC/AC power sources. According to an embodiment of the disclosure, the power receiving unit 412 may receive AC power and may generate power of a predetermined DC voltage through an appropriate transformation, a power factor correction, and/or a rectification process.

According to an embodiment of the disclosure, the voltage converter 414 may include a plurality of DC/DC converters, and through each of the plurality of DC/DC converters, the voltage converter 414 may convert a DC voltage received from the power receiving unit 412 into a plurality of DC voltages and output the DC voltages. According to an embodiment of the disclosure, the plurality of DC voltages output from the voltage converter 414 may be different voltages. According to an embodiment of the disclosure, the voltage converter 414 may output, for example, four DC voltages of 20V, 15V, 9V, and 5V, although the disclosure is not limited thereto. According to an embodiment of the disclosure, the current of each voltage output from the voltage converter 414 may be transmitted to the feeding unit 120 through each corresponding power supply line 150 of the plurality of power supply lines 150.

According to various embodiments of the disclosure, a maximum total amount of power supplying that the power adapter 400 can provide through the plurality of power supply lines 150 may be predetermined. Further, according to various embodiments of the disclosure, a maximum amount of power supplying that each DC/DC converter of the voltage converter 414 (or for each power supply line) can provide as its output may be predetermined.

According to an embodiment of the disclosure, as described above referring to FIG. 1, the feeding unit 120 may include a plurality of electrodes. According to an embodiment of the disclosure, each electrode included in the feeding unit 120 may be connected to each corresponding power supply line 150 to obtain a current of each corresponding voltage. According to an embodiment of the disclosure, each electrode of the feeding unit 120 may provide a current of a corresponding voltage of the electrode to the outside through a connector (not shown in this drawing) connected thereto. According to an embodiment of the disclosure, each electrode of the feeding unit 120 may include a linear portion extending long enough to allow a plurality of connectors to be simultaneously connected, side by side, to each corresponding electrode, just as each electrode of the feeding unit 120, 220, or 320 described above with reference to FIGS. 1, 2A, 2B, 3A, 3B and 3C. According to an embodiment of the disclosure, the electrodes of the feeding unit 120 may be arranged to extend side by side in a straight or curved direction (e.g., in the shape of a straight or curved rail) while maintaining a certain distance from other neighboring electrodes, although the disclosure is not limited thereto. The configuration of the feeding unit 120 according to various embodiments of the disclosure will be described in greater detail below with reference to FIGS. 14 to 19.

According to an embodiment of the disclosure, the power balancing control unit 416 may include various control circuitry and obtain information from each power supply line 150 through the signal wiring 420 connected to each of a plurality of power supply lines 150. According to an embodiment of the disclosure, the power balancing control unit 416 may obtain information on the amount of power usage flowing on each power supply line 150, based on information obtained through the signal wiring 420. According to an embodiment of the disclosure, the power balancing control unit 416 may obtain current information about current flowing on each power supply line 150 through the signal wiring 420, and may obtain information on the amount of power usage for the corresponding power supply line 150, using the obtained current information and a voltage (predetermined) corresponding to the corresponding power supply line 150.

According to an embodiment of the disclosure, the power balancing control unit 416 may add up the amount of power usage obtained for each of the power supply lines 150 to obtain a total amount of power usages being currently used by the power supply 110. According to an embodiment of the disclosure, the power balancing control unit 416 may provide information on the obtained total amount of power usages (for example, information on a value of the total amount of power usages or a ratio of the total amount of power usages to the maximum total amount of power supply of the power adapter) to the power feeding unit 120, through the signal line 426. According to an embodiment of the disclosure, as will be described in greater detail below, the feeding unit 120 may visually display information on the total amount of power usages received through the signal line 426 through a display unit (to be described in greater detail below with reference to FIG. 19) provided on the feeding unit 120. In such a case, the user may intuitively identify the power consumption status of the power adapter 400 from an indicating status of the display unit of the feeding unit 120, and may determine whether to connect an additional connector based thereon.

According to an embodiment of the disclosure, the power balancing control unit 416 may determine, from among the plurality of power supply lines 150, a power supply line (hereinafter, referred to as a distributed power receive line) to receive power from other power supply line through power balancing (or redistribution) and another power supply line (hereinafter, referred to as a distributed power supply line) to provide available power for power balancing. According to an embodiment of the disclosure, when the distributed power receive line and the distributed power supply line are determined, the power balancing control unit 416 may generate an operation control signal for the power balancing unit 418, based on the determination. According to an embodiment of the disclosure, the operation control signal generated by the power balancing control unit 416 may cause the power balancing unit 418 to draw a current from the distributed power supply line, transform a voltage of the drawn current into a voltage corresponding to the distributed power receive line, and provide a current of the transformed voltage to the distributed power receive line. According to an embodiment of the disclosure, the power balancing control unit 416 may provide the generated operation control signal to the power balancing unit 418 through the control signal line 424.

According to an embodiment of the disclosure, the power balancing unit 418 may operate to, based on the operation control signal obtained through the control signal line 424, draw a current from any power supply line (or a distributed power supply line) among the plurality of power supply lines 150 through the power wiring 422, and appropriately step-up (boost) or step-down (drop) a voltage of the drawn current to provide the voltage to another power supply line (or distributed power receive line) among the plurality of power supply lines 150. According to an embodiment of the disclosure, the power balancing unit 418 may sequentially and alternately draw-in the current from two or more distributed power supply lines, and boost or drop the voltage of the drawn-in current to provide the voltage to the distributed power receive line. Although not specifically illustrated in the drawings, according to an embodiment of the disclosure, the power balancing unit 418 may include a switch for selectively forming a current flow path between the distributed power supply line and the distributed power receive line, and a transformer unit for performing voltage boosting or dropping for voltage matching between the two lines. The functions and operations of the power balancing control unit 416 and the power balancing unit 418 according to various embodiments of the disclosure will be further described in greater detail below with reference to FIGS. 5 to 13.

Figure 5A:
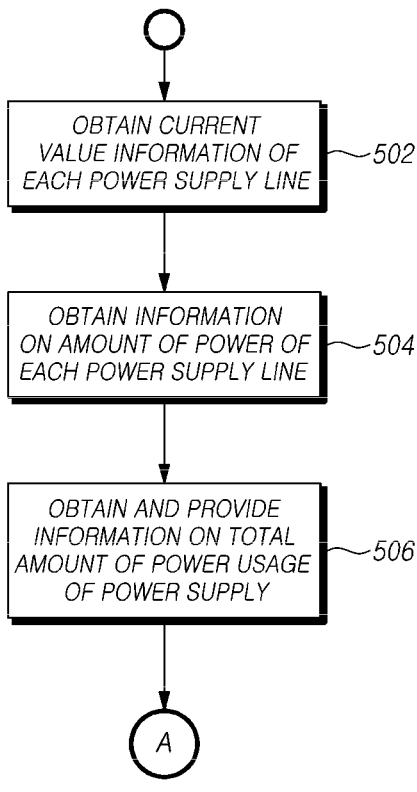
FIGS. 5A, 5B and 5C are flowcharts illustrating example operations performed by a power balancing control unit, according to various embodiments.
Figure 5B:
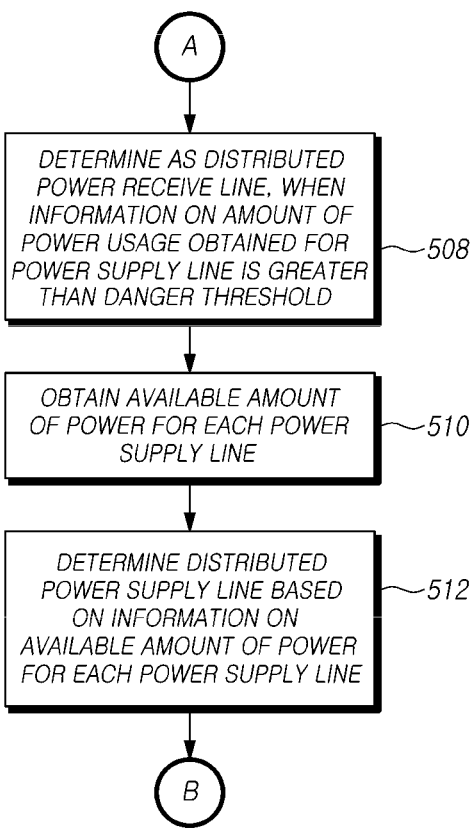
Figure 5C:
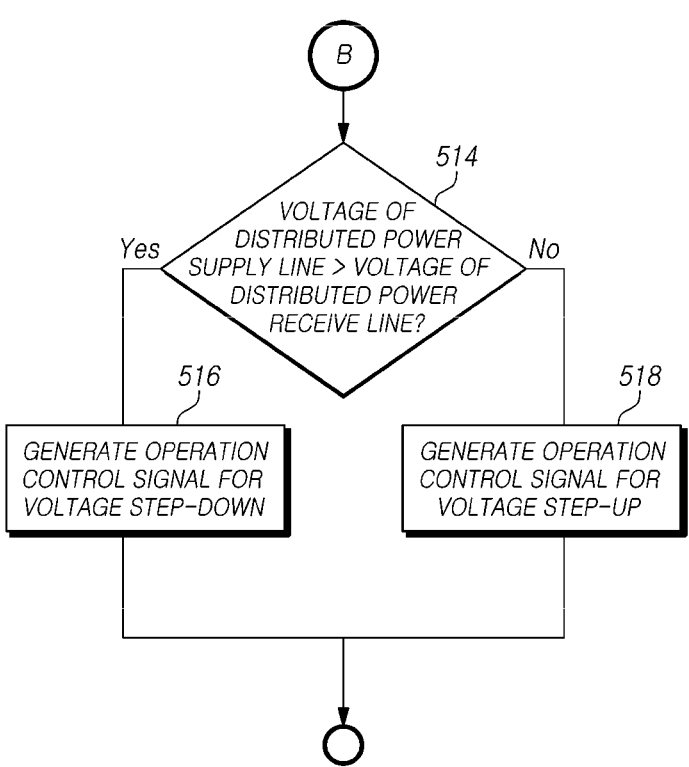

FIGS. 5A, 5B and 5C are flowcharts illustrating an operation flow performed by a power balancing control unit (e.g., the power balancing control unit 416 of FIG. 4), according to various embodiments. FIG. 5A illustrates an example flow of operations in which the power balancing control unit 416 obtains the amount of power usage of each power supply line. FIG. 5B illustrates an example flow of operations in which the power balancing control unit 416 determines whether to be either a distributed power supply line or a distributed power receive line, for each power supply line. FIG. 5C illustrates an example flow of operations in which the power balancing control unit 416 generates an operation control signal for the power balancing unit 418 such that power redistribution is made between a distributed power supply line and a distributed power receive line. It is to be appreciated that these drawings and the following descriptions related thereto are for illustrating example operation flow of the power balancing control unit 416 according to an embodiment of the disclosure, and the present disclosure is not limited to the corresponding embodiments.

Referring to FIG. 5A, the power balancing control unit 416 may obtain the amount of power usage of each power supply line 150. In operation 502, the power balancing control unit 416 may obtain current information about current flowing through a corresponding power supply line from each of the power supply lines 150 through the signal wiring 420. In operation 504, the obtained current information may be multiplied by a voltage pre-determined for the corresponding power supply line to obtain the amount of power usage on the power supply line. In operation 506, it may obtain the total amount of power usage being currently used by the power supply 110 by adding up the amount of power usages for each power supply line obtained in the operation 504, and provide the total amount of power usage as a control signal for the feeding unit 120.

In FIG. 5B, the power balancing control unit 416 may determine whether the corresponding power supply line is to be either a distributed power supply line or a distributed power receive line, for each power supply line 150. In operation 508, the power balancing control unit 416 may compare the previously obtained amount of power usage with a danger threshold power amount determined for the corresponding power supply line 150, for each power supply line 150, and when the amount of power usage is greater than or equal to the danger threshold power amount, may determine the corresponding power supply line as a distributed power receive line. According to an embodiment of the disclosure, the danger threshold power amount may be a reference power amount determined for each power supply line (or for each corresponding DC/DC converter). According to an embodiment of the disclosure, the danger threshold power amount may be any set value equal to or less than the maximum amount of power supply determined for each power supply line.

In operation 510, the power balancing control unit 416 may obtain, for each power supply line 150, a difference between the obtained amount of power usage and an upper-limit threshold power amount determined for the corresponding power supply line 150, as an amount of available power of the corresponding power supply line 150. According to an embodiment of the disclosure, in operation 510, the power balancing control unit 416 may obtain an amount of available power for each of the remaining power supply lines 150 except for the power supply line previously determined as the distributed power receive line in the operation 508. According to an embodiment of the disclosure, the upper-limit threshold power amount may be a reference value determined for each power supply line. According to an embodiment of the disclosure, the upper-limit threshold power amount for each power supply line 150 may be a value equal to or greater than the aforementioned danger threshold power amount for that power supply line 150, although the disclosure is not limited thereto.

In operation 512, the power balancing control unit 416 may determine, for each power supply line 150, one or more power supply lines as a distributed power supply line, based on the amount of available power obtained in the operation 510. According to an embodiment of the disclosure, the power balancing control unit 416 may compare the amount of available power obtained for each power supply line 150 with each other, and determine one or more power supply lines having a higher amount of available power as a distributed power supply line according to predetermined criteria, and the disclosure is not limited thereto.

In FIG. 5C, the power balancing control unit 416 may generate an operation control signal for the power balancing unit 418 to perform power redistribution (balancing) between the distributed power supply line and the distributed power receive line. In operation 514, the power balancing control unit 416 may determine whether the voltage of the distributed power supply line is greater than the voltage of the distributed power receive line. When it is determined in the operation 514 that the voltage of the distributed power supply line is greater than the voltage of the distributed power receive line, the power balancing control unit 416 in operation 516 may generate an operation control signal for each switch/switching element of the power balancing unit 418 to step-down the voltage. When it is determined in the operation 514 that the voltage of the distributed power supply line is lower than the voltage of the distributed power receive line, the power balancing control unit 416 in the operation 518 may generate an operation control signal for each switch/switching element of the power balancing unit 418 to step-up the voltage.

Figure 6:
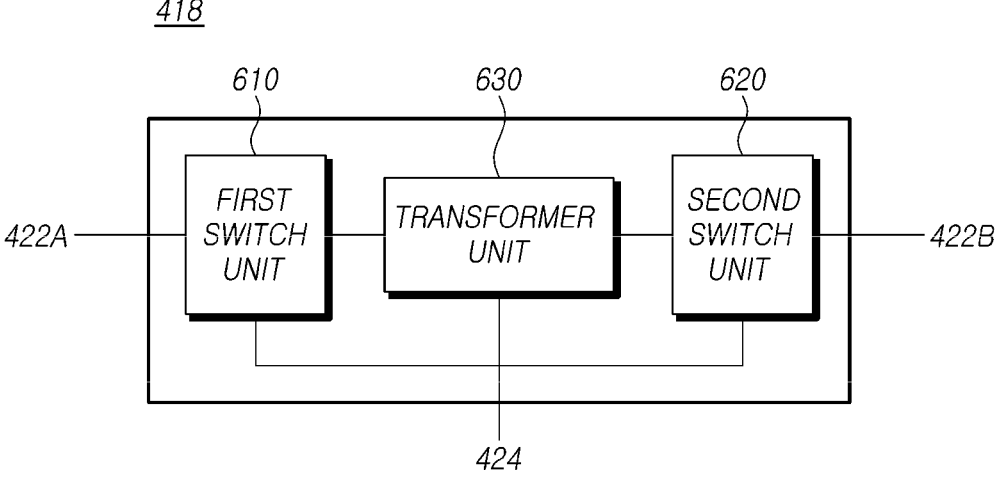
FIG. 6 is a block diagram illustrating an example configuration of a power balancing unit, according to various embodiments.

FIG. 6 is a block diagram illustrating an example configuration of a power balancing unit (e.g., the power balancing unit 418 of FIG. 4), according to various embodiments. As illustrated, the power balancing unit 418 includes a first switch unit (e.g., including a switch) 610, a second switch unit (e.g., including a switch) 620, and a transformer unit (e.g., including a transformer) 630.

According to various embodiments of the disclosure, both ends of the power balancing unit 418 may be connected to a plurality of power supply lines 150, respectively. According to various embodiments of the disclosure, as illustrated in the drawings, one end of the first switch unit 610 and one end of the second switch unit 620 may be connected to the power wirings 422A and 422B, respectively. In the drawings, the power wirings 422A and 422B are illustrated as if they are one wiring, but it is to be noted that this is only for convenience of illustration and the power wirings 422A and 422B may be a bundle of power wirings connected to each of a plurality of power supply lines 150. Further, it is to be appreciated that the power wiring 422A and the power wiring 422B are for distinguishing respective power wirings connected to the first switch unit 610 and the second switch unit 620, and both may represent power wirings connected to the plurality of power supply lines 150, respectively.

According to various embodiments of the disclosure, as illustrated in the drawings, the transformer unit 630 may be connected between the first switch unit 610 and the second switch unit 620. According to various embodiments of the disclosure, each of the first switch unit 610 and the second switch unit 620 may receive an operation control signal from the power balancing control unit 416 via the control signal line 424. According to various embodiments of the disclosure, each of the first switch unit 610 and the second switch unit 620 may control its internal switching operation according to the received operation control signal. According to various embodiments of the disclosure, the transformer unit 630 may receive the operation control signal from the power balancing control unit 416 via the control signal line 424. According to various embodiments of the disclosure, the transformer unit 630 may control one or more internal switching elements based on the received operation control signal, to provide an appropriate step-up or step-down in the voltage of the current flowing in the transformer unit 630.

Figure 7:
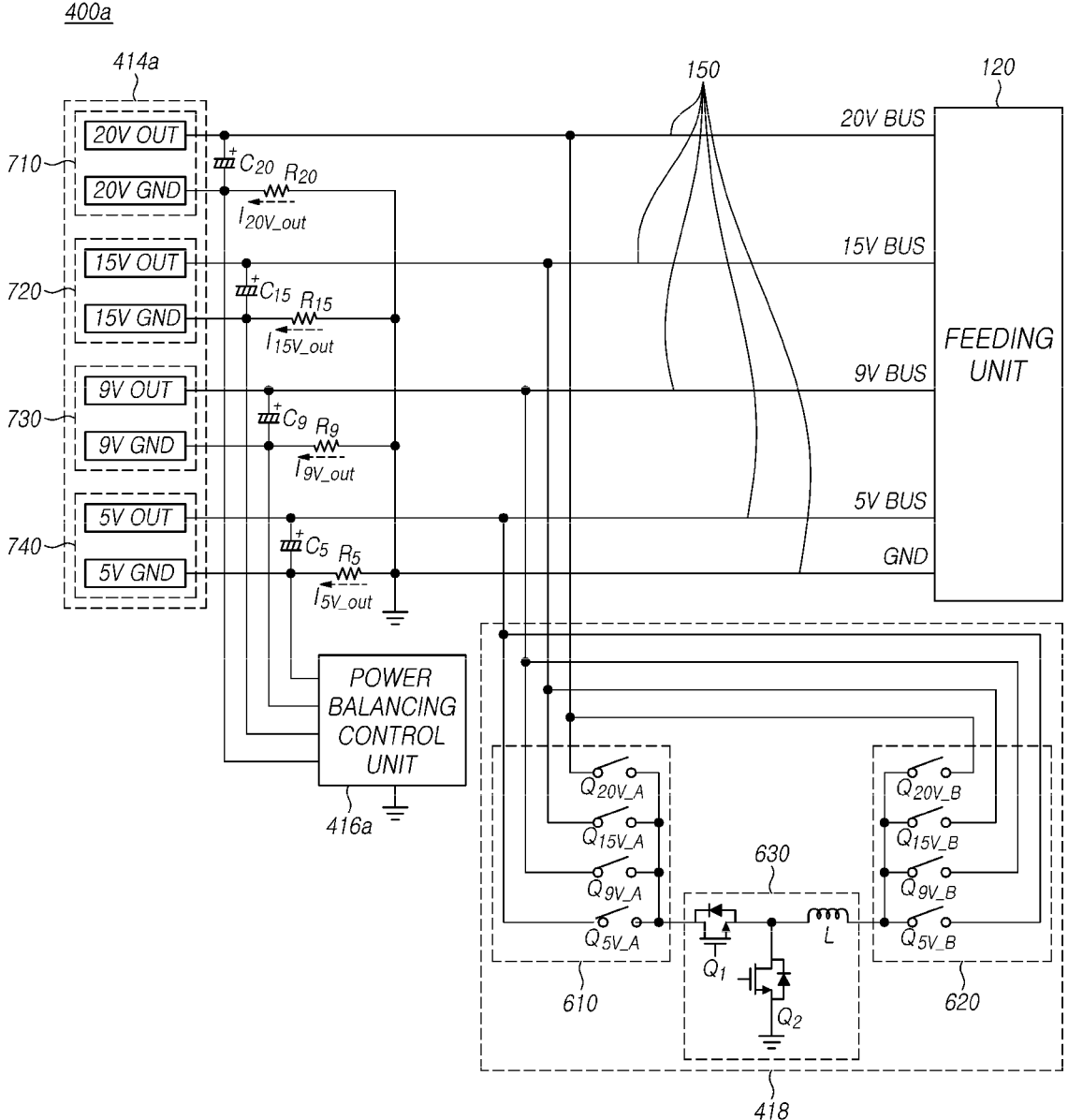
FIG. 7 is a diagram illustrating an example circuit configuration of a power adapter, according to various embodiments.
Figure 8:
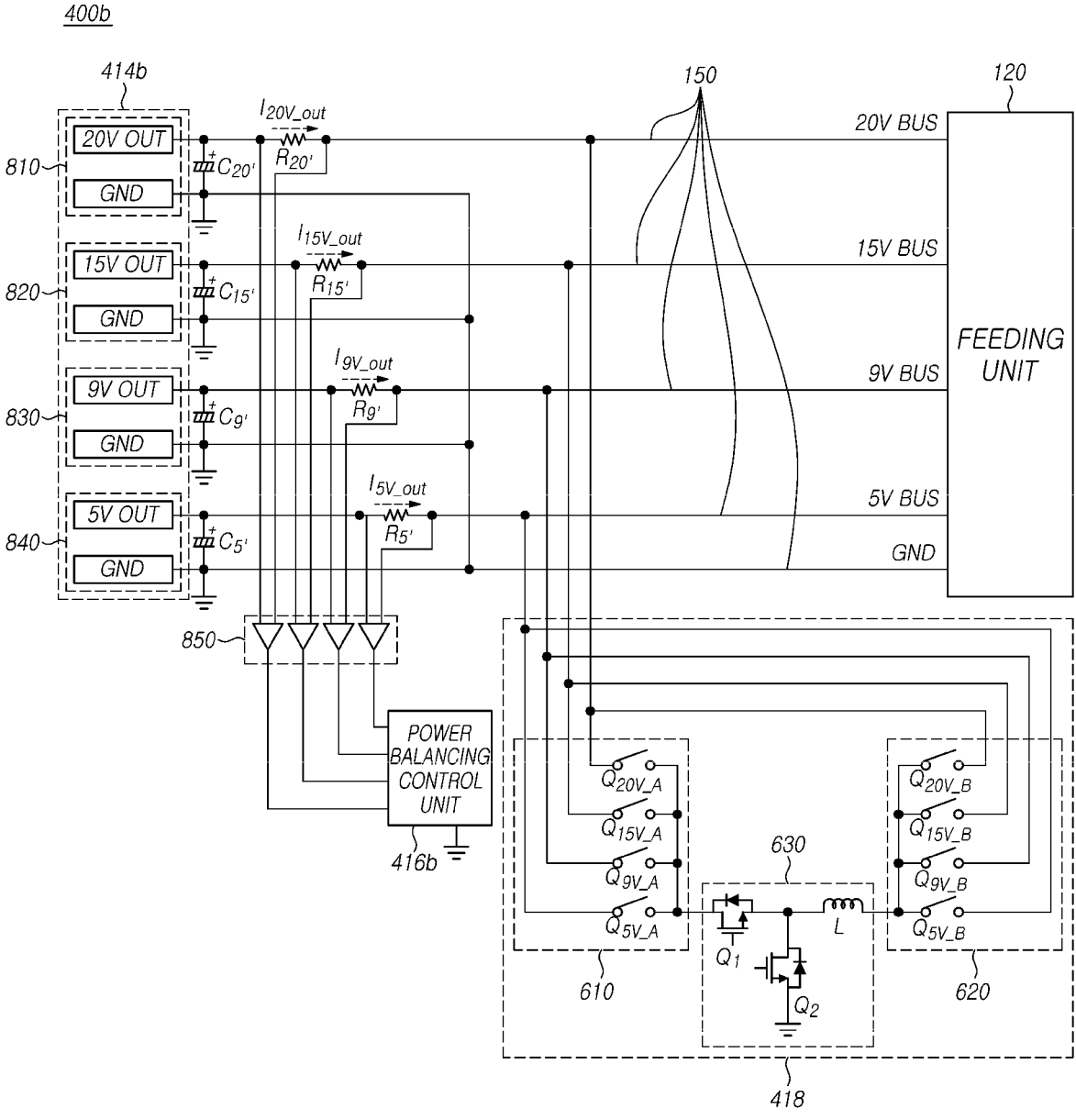
FIG. 8 is a diagram illustrating an example circuit configuration of a power adapter, according to various embodiments.

FIGS. 7 and 8 are diagrams illustrating example circuit configurations of a power adapter according to various embodiments. Referring to FIG. 7 or FIG. 8, the power adapter (400a, 400b) includes a voltage converter (414a, 414b), a plurality of power supply lines 150, a feeding unit 120, a power balancing control unit (416a, 416b), and a power balancing unit 418. Hereinafter, the circuit configuration illustrated in FIG. 7 or FIG. 8 and the following description thereof are merely an example for describing various embodiments of the disclosure, and it is to be noted that the disclosure is not limited to such a specific configuration.

Compared to the power adapter 400 of FIG. 4, the power adapter (400a, 400b) illustrated in FIG. 7 or 8 omits the configuration of the power receiving unit before the voltage converter (414a, 414b) for convenience of illustration and description. Each of the voltage converters (414a, 414b) illustrated in FIG. 7 or FIG. 8 is briefly illustrated as including four converters (710-740, 810-840) that provide respective voltages of 20V, 15V, 9V and 5V, according to an embodiment of the disclosure.

Referring to FIG. 7, as illustrated, according to an embodiment of the disclosure, the DC/DC converters (710, 720, 730, 740) of the voltage converter 414a may be configured in an insulated type such that each may have a different ground. According to an embodiment of the disclosure, resistors (R20, R15, R9, R5) may be respectively disposed on a return path connected to the ground, for each of the DC/DC converters (710, 720, 730, 740), as shown in FIG. 7, and a current signal passing through each resistor may be transferred to the power balancing control unit 416a, respectively. According to an embodiment of the disclosure, as illustrated in FIG. 7, capacitors (C20, C15, C9, C5) may be disposed between each voltage output terminal (e.g., 20V OUT, 15V OUT, 9V OUT, 5V OUT) and the ground, for each DC/DC converter (710, 720, 730, 740), and the resistors (R20, R15, R9, R5) may be disposed between the ground and a negative electrode of each capacitor (C20, C15, C9, C5), so that the current passing through each resistor on the return path may be transmitted to the power balancing control unit 416a. According to an embodiment of the disclosure, the power balancing control unit 416a may obtain the amount of power consumed on each power supply line 150 from each received current signal.

Referring to FIG. 8, as illustrated, according to an embodiment of the disclosure, the DC/DC converters (810, 820, 830, 840) of the voltage converter 414b may be configured in a non-insulated type so that they have a common ground GND not separated from each other. In such a case, as illustrated in FIG. 8, resistors (R20', R15', R9', R5') may be respectively disposed at respective voltage output terminals (e.g., 20V OUT, 15V OUT, 9V OUT, 5V OUT) for each DC/DC converter (810, 820, 830, 840), and current across both ends of the resistors may be transmitted to an input of a respective corresponding differential amplifier in a differential amplification stage 850, respectively. According to an embodiment of the disclosure, the differential amplification stage 850 may be configured to transmit an output from each differential amplifier to the power balancing control unit 416b. Meanwhile, according to an embodiment of the disclosure, the capacitors (C20', C15', C9', C5') may be disposed between each voltage output terminal (e.g., 20V OUT, 15V OUT, 9V OUT, 5V OUT) and the ground, for each DC/DC converter (810, 820, 830, 840), although the disclosure is not limited thereto. According to an embodiment of the disclosure, the power balancing control unit 416b may obtain the amount of power consumption on each power supply line from each received signal. According to an embodiment of the disclosure, the power balancing control unit (416a, 416b) illustrated in FIG. 7 or FIG. 8 may include an MCU, and the disclosure is not limited thereto.

Referring to FIG. 7 or FIG. 8, the power balancing unit 418 includes a first switch unit 610, a second switch unit 620, and a transformer unit 630, as seen in FIG. 6. As illustrated herein, the first switch unit 610 may include four switches ($Q_{20V\_A}$, $Q_{15V\_A}$, $Q_{9V\_A}$, $Q_{5V\_A}$). As illustrated herein, the second switch unit 620 may include four switches ($Q_{20V\_B}$, $Q_{15V\_B}$, $Q_{9V\_B}$, $Q_{5V\_B}$). As illustrated herein, each of the four switches ($Q_{20V\_A}$, $Q_{15V\_A}$, $Q_{9V\_A}$, $Q_{5V\_A}$) of the first switch unit 610 may be connected to each of the plurality of power supply lines 150 at its one end to switch passing/blocking of signals from/to the corresponding power supply line 150. Similarly, each of the four switches ($Q_{20V\_B}$, $Q_{15V\_B}$, $Q_{9V\_B}$, $Q_{5V\_B}$) of the second switch unit 620 may be connected to each of the plurality of power supply lines 150 at its one end to switch passing/blocking of signals from/to the corresponding power supply line 150.

Referring to FIG. 7 or FIG. 8, the transformer unit 630 includes a first switching element $Q_1$, an inductor L having one end connected in series to one end of the first switching element $Q_1$, and a second switching element $Q_2$ disposed in parallel between the first switching element $Q_1$ and the inductor L and connected to the ground. As illustrated in FIG. 7 or FIG. 8, the other end of each switch of the first switch unit 610 (an opposite side of the side connected to each power supply line 150) may be connected to the other end of the first switching element $Q_1$ (an opposite side of the side connected to the inductor L). Referring to FIG. 7 or 8, the other end of each switch of the second switch unit 620 (an opposite side of the side connected to each power supply line 150) may be connected to the other end of the inductor L (an opposite side of the side connected to the first switching element $Q_1$).

According to various embodiments of the disclosure, although not shown in the drawings, the power balancing control unit (416a, 416b) may generate an operation control signal for the power balancing unit 418, as described above. In FIGS. 7 and 8, it should be understood that the signal path in which the operation control signal is transmitted from the power balancing control unit (416a, 416b) to the power balancing unit 418 is omitted for convenience of description and illustration. According to various embodiments of the disclosure, the operation control signal generated by the power balancing control unit (416a, 416b) may include respective on/off control signals for each switch of the first switch unit 610, each switch of the second switch unit 620, and each switching element of the transformer unit 630 of the power balancing unit 418. According to various embodiments of the disclosure, the operation control signal may include a PWM control signal for each switching element of the transformer unit 630. According to various embodiments of the disclosure, a current flow direction passing through the first switch unit 610, the transformer unit 630, and the second switch unit 620 may be determined based on the operation control signal, and an appropriate voltage boosting or dropping according to the current flow may be performed.

Figure 9:
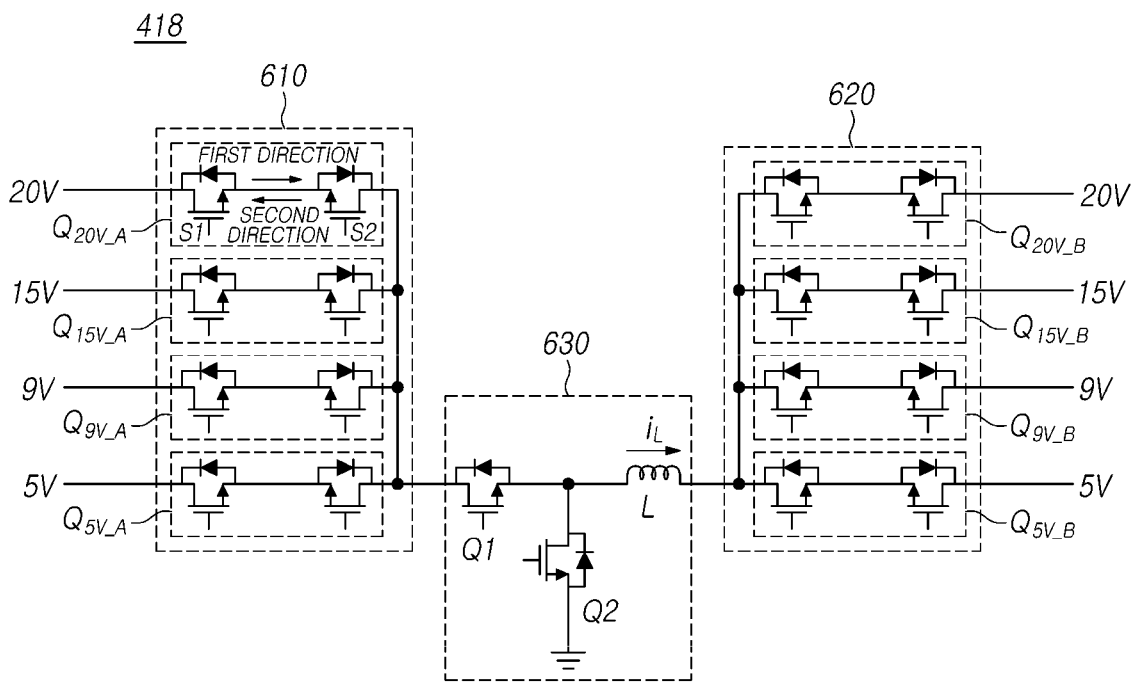
FIG. 9 is a diagram illustrating part of an example circuit configuration of a power balancing unit, according to various embodiments.

FIG. 9 is a diagram a part of an example circuit configuration of a power balancing unit 418 (e.g., the power balancing unit 418 of FIGS. 4 and 6 to 8), according to various embodiments. In this drawing is illustrated an example configuration of each switch of the first switch unit 610 and the second switch unit 620 of the power balancing unit 418 illustrated in FIG. 7 or 8. Referring to the drawings, each of the first switch unit 610 and the second switch unit 620 may be connected to a power supply line that provides currents of 20 V, 15 V, 9 V, and 5 V voltages, respectively, as illustrated in FIG. 7 or 8. Further, as illustrated in FIG. 9, each of the four switches ($Q_{20V\_A}$, $Q_{15V\_A}$, $Q_{9V\_A}$, $Q_{5V\_A}$) of the first switch unit 610 or each of the four switches ($Q_{20V\_B}$, $Q_{15V\_B}$, $Q_{9V\_B}$, $Q_{5V\_B}$) of the second switch unit 620 is configured to include two switching elements (e.g., FET S1 and FET S2 elements in the case of the switch $Q_{20V\_A}$) connected in series, and the disclosure is not limited thereto.

According to an embodiment of the disclosure, each of switching elements included in each of the four switches ($Q_{20V\_A}$, $Q_{15V\_A}$, $Q_{9V\_A}$, $Q_{5V\_A}$) of the first switch unit 610 or in each of the four switches ($Q_{20V\_B}$, $Q_{15V\_B}$, $Q_{9V\_B}$, $Q_{5V\_B}$) of the second switch unit 620 may be controlled to be turned on/off based on an operation control signal from the power balancing control unit (e.g., the power balancing control unit 416 of FIG. 4), respectively. According to an embodiment of the disclosure, for example, when each switch ($Q_{20V\_A}$, $Q_{15V\_A}$, $Q_{9V\_A}$, $Q_{5V\_A}$, $Q_{20V\_B}$, $Q_{15V\_B}$, $Q_{9V\_B}$, $Q_{5V\_B}$) of the first switch unit 610 or the second switch unit 620 is configured to include two switching elements as shown in the drawing, the direction of flow of the current passing through the corresponding switch may be controlled by controlling ON/OFF of each switching element. For example, in the case of the switch $Q_{20V\_A}$, a current flow in one direction may be generated across the switch $Q_{20V\_A}$ by turning On the FET S1 and turning ON or OFF the FET S2. As opposed to the above, in the switch $Q_{20V\_A}$, a current flow in two directions may be generated across the switch $Q_{20V\_A}$ by turning ON the FET S2 and turning ON or OFF the FET S1. Since such a controlling of the direction of the current flow as described above is common to the remaining switches $Q_{15V\_A}$, $Q_{9V\_A}$, $Q_{5V\_A}$, $Q_{20V\_B}$, $Q_{15V\_B}$, $Q_{9V\_B}$, and $Q_{5V\_B}$ shown in the drawing, a detailed description thereof will be omitted for brevity's sake.

Figure 10:
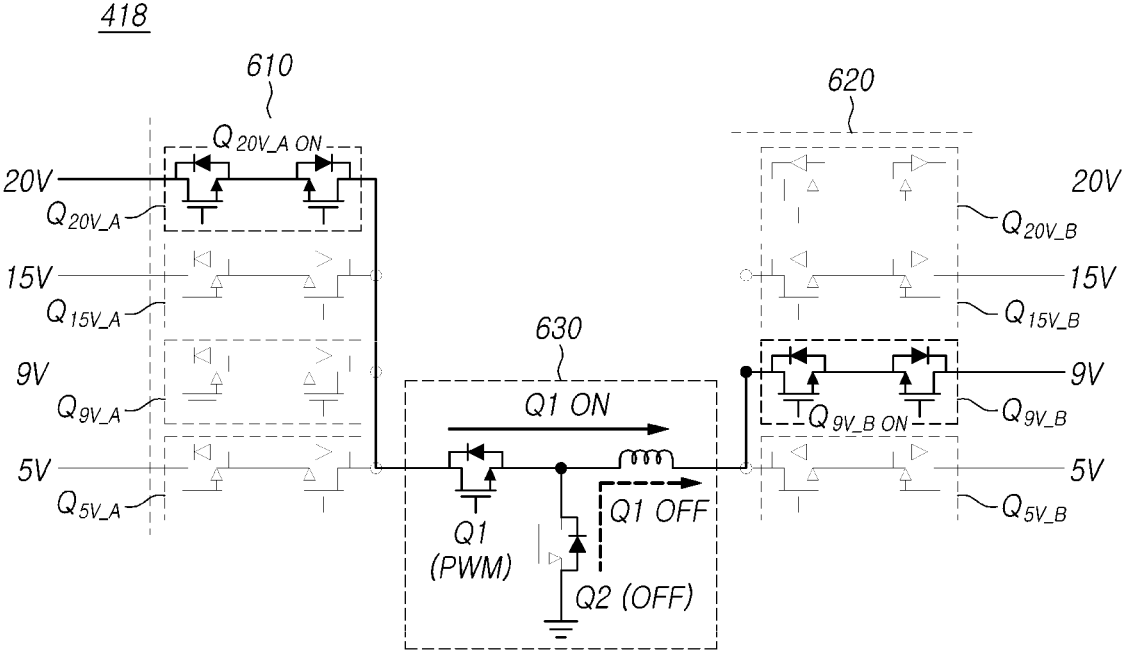
FIG. 10 is a diagram illustrating an example current flow that may occur in a power balancing unit when a power redistribution is performed by voltage step-down, according to various embodiments.

FIG. 10 is a diagram illustrating an example current flow that may occur in a power balancing unit (e.g., the power balancing unit 418 of FIG. 9) when a power redistribution is performed by voltage step-down, according to various embodiments. This drawing may show the current flow in case where a power supply line with a voltage of 20 V is selected as a distributed power supply line, and a power supply line with a voltage of 9 V is selected as a distributed power receive line, for example, by the power balancing control unit 416.

As illustrated in FIG. 10, it is shown a state that the switch $Q_{20V\_A}$ of the first switch unit 610 is closed, and the switch $Q_{9V\_B}$ of the second switch unit 620 is closed. According to an embodiment of the disclosure, the switching element Q2 of the transformer unit 630 may be turned OFF, and the switching element Q1 may be PWM-controlled. In such a case, in the transformer unit 630, when the switching element Q1 is in the ON state, a current flow occurs in the direction of a solid-lined arrow (e.g., a current flow occurs from the switch $Q_{20V\_A}$), while when the switching element Q1 is in the OFF state, a current flow occurs in the direction of a dotted-lined arrow, whereby the voltage of the current drawn through the switch $Q_{20V\_A}$, that is, the voltage of 20V voltage, is stepped down to a voltage of 9V, so that the current of the stepped-down voltage may be provided through the switch $Q_{9V\_B}$. Although not shown in the drawing, for example, the voltage balancing control unit 416 may determine that the voltage (e.g., 20V) of the distributed power supply line is higher than the voltage (e.g., 9V) of the distributed power receive line, and therefore, may generate an appropriate control signal for allowing the switch $Q_{20V\_A}$ for the distributed power supply line of the first switch unit

610 to conduct and the distributed power receive line $Q_{9B\_B}$ of the second switch unit 620 to conduct, so that the power balancing unit 418 can perform an appropriate step-down of the voltage. Further, the voltage balancing control unit 416 may generate an appropriate PWM control signal for the switching element Q1 of the transformer unit 630 such that an appropriate drop for matching the voltage (e.g., 20V) of the distributed power supply line to the voltage (e.g., 9V) of the distributed power receive line may be performed.

Figure 11:
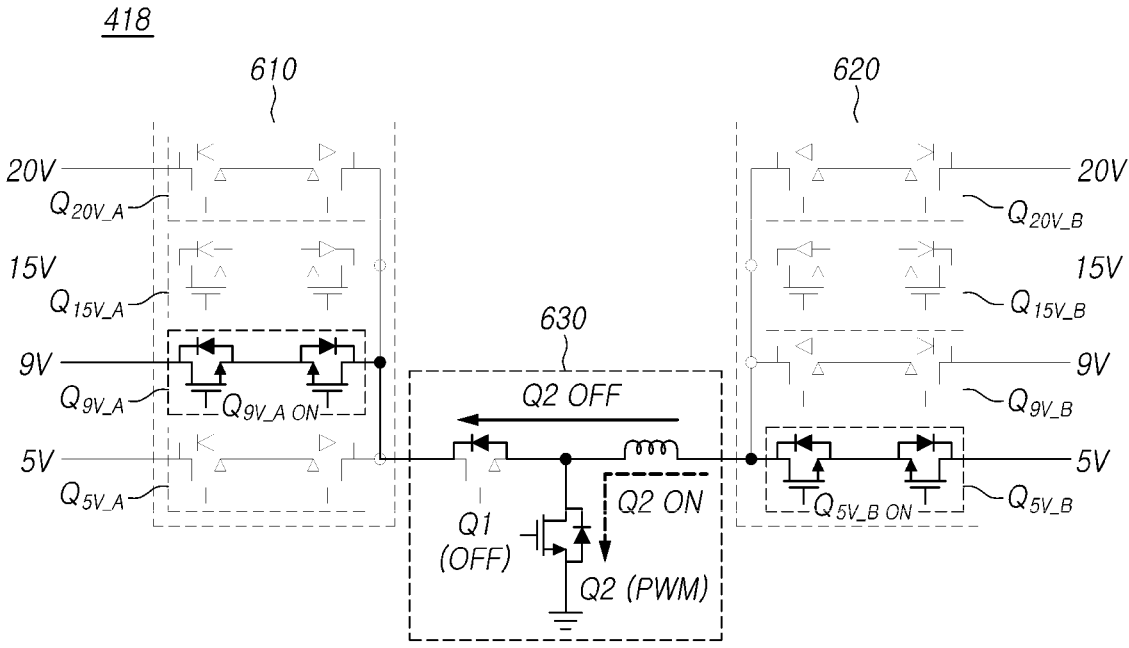
FIG. 11 is a diagram illustrating an example current flow that may occur in a power balancing unit when a power redistribution is performed by voltage step-up, according to various embodiments.

FIG. 11 is a diagram illustrating an example power flow that may occur in a power balancing unit (e.g., the power balancing unit 418 of FIG. 9) when a power redistribution is performed by voltage boosting, according to various embodiments. This drawing may illustrate a flow of power, for example, in case where a power supply line of a 5V voltage is selected as a distributed power supply line and a power supply line of a 9V voltage is selected as a distributed power receive line, by the power balancing control unit 416.

As illustrated in FIG. 11, the switch $Q_{5V\_B}$ of the second switch unit 620 is in a closed state, and the switch $Q_{9V\_A}$ of the first switch unit 610 is in a closed state. According to an embodiment of the disclosure, the switching element Q1 of the transformer unit 630 may be turned OFF, and the switching element Q2 may be PWM-controlled. In such a case, in the transformer unit 630, when the switching element Q2 is in the OFF state, a current flows along the direction of the solid-lined arrow (e.g., the current flow occurs from the switch $Q_{5V\_B}$), and when the switching element Q2 is in the ON state, a current flows along the direction of the dotted-lined arrow, whereby the voltage of the current introduced through the switch $Q_{5V\_B}$, that is, the voltage of 5V, is boosted to the voltage of 9V, and the current of the boosted voltage may be provided through the switch $Q_{9V\_A}$. Although not shown in the drawings, for example, the voltage balancing control unit 416 may determine that the voltage (e.g., 5V) of the distributed power supply line is lower than the voltage (e.g., 9V) of the distributed power receive line, and may generate an appropriate control signal for allowing the switch $Q_{9V\_A}$ for the distributed power receive line of the first switch unit 610 to conduct and the distributed power supply line $Q_{5V\_B}$ of the second switch unit 620 to conduct so that the power balancing unit 418 may perform an appropriate voltage boosting. Further, the voltage balancing control unit 416 may generate an appropriate PWM control signal for the switching element Q2 of the transformer unit 630 such that appropriate boosting for matching the voltage (5V) of the distributed power supply line to the voltage (9V) of the distributed power receive line may be performed.

As may be seen from FIGS. 10 and 11, according to an embodiment of the disclosure, a bidirectional current flow may be selectively generated in between the first switch unit 610 and the second switch unit 620, and an appropriate voltage step-down or step-up may be provided onto the generated current flow.

Figure 12:
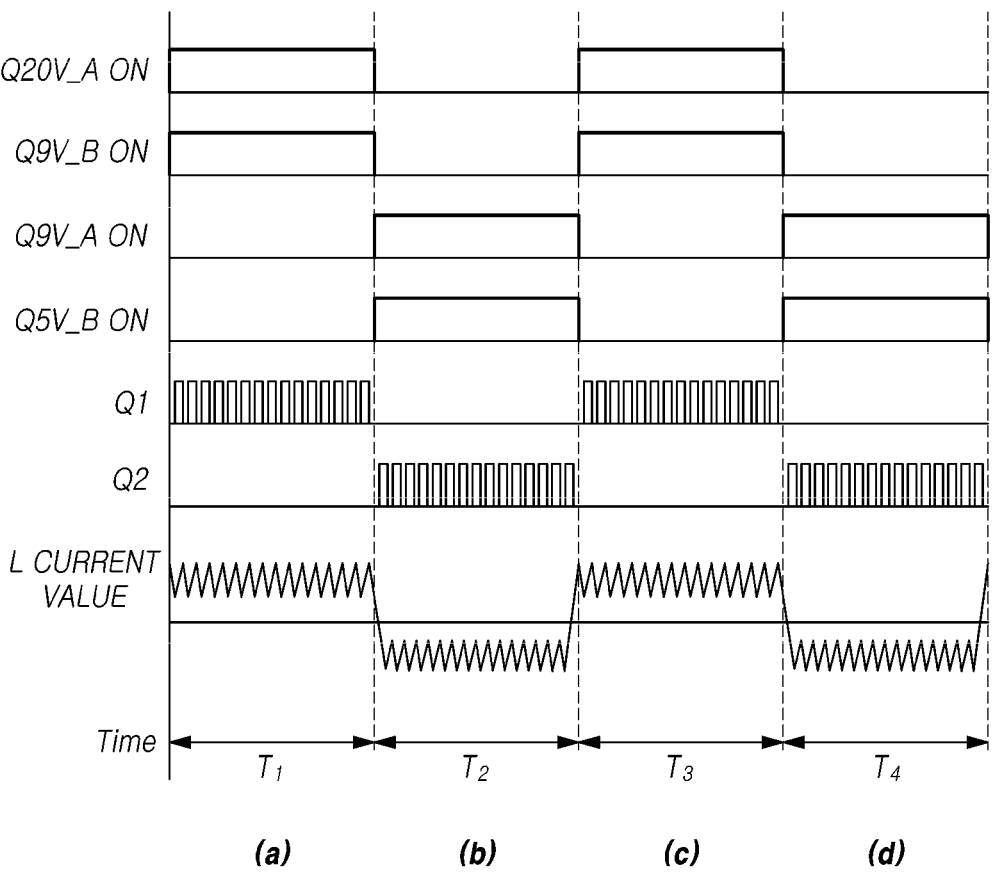
FIG. 12 is a timing diagram illustrating changes in a control signal and an inductor current value of related elements of a power balancing unit over time, when a power redistribution operation is performed by alternately making step-down and step-up of voltage, according to various embodiments.

FIG. 12 is a timing diagram illustrating changes in a control signal and an inductor current value of related elements of a power balancing unit over time, when a power redistribution is performed by alternately performing step-down and step-up of voltage, according to various embodiments. This diagram may show a control flow in case where both the power supply line of 20 V voltage and the power supply line of 5 V voltage are selected as a distributed power supply line and the power supply line of 9 V voltage is selected as a distributed power receive line, by the power balancing control unit 416, for example. In this diagram are indicated the control signals, for each time interval, of respective related switches (e.g., $Q_{20V\_A}$, $Q_{9V\_B}$, $Q_{9V\_A}$, $Q_{5V\_B}$) and switching elements (Q1, Q2), and the change in the current flowing through the inductor L for each time interval corresponding thereto, in case that in the power balancing unit 418, currents from the power supply line of 20V voltage and the power supply line of 5V voltage are, in a time division, stepped-down or stepped-up in voltage, respectively, and provided to the power supply line of 9V voltage.

For example, referring to (a) of FIG. 12, in the time interval $T_1$, as seen in FIG. 10, an ON signal may be given to the switch $Q_{20V\_A}$ and the switch $Q_{9V\_B}$ (whereas an OFF signal may be given to the remaining switches of the first switch unit 610 and the second switch unit 620, including the switch $Q_{9V\_A}$ and the switch $Q_{5V\_B}$), and an OFF signal may be given to the switching element Q2 of the transformer unit 630. Further, an appropriate PWM control signal may be given to the switching element Q1 of the transformer unit 630, and a current of 20V voltage may flow with appropriate step-down to a current of 9V voltage through the inductor L according to ON/OFF switching of the switching element Q1.

Further, referring to (b) of FIG. 12, in the time interval $T_2$, as seen in FIG. 11, an ON signal may be given to the switch $Q_{9V\_A}$ and the switch $Q_{5V\_B}$ (whereas an OFF signal may be given to the remaining switches of the first switch unit 610 and the second switch unit 620, including the switch $Q_{20V\_A}$ and the switch $Q_{9V\_B}$), and an OFF signal may be given to the switching element Q1 of the transformer unit 630. Further, an appropriate PWM control signal may be given to the switching element Q2 of the transformer unit 630, and a current of 5V voltage may flow as appropriately boosted to a current of 9V voltage through the inductor L according to an ON/OFF switching of the switching element Q2.

Referring to (c) and (d) of FIG. 12, in the time intervals $T_3$ and $T_4$, the control signal in the time interval $T_1$ of (a) of FIG. 12, the control signal in the time interval $T_2$ of (b) of FIG. 12, and the current flow according to each situation are repeatedly generated. The flow of the control signal shown in this drawing is merely of an example presented to help understanding of the disclosure, and it should be noted that various combinations of control signals and their signal flows may be generated according to embodiments of the disclosure.

While the drawings and their associated description of the disclosure have described on the basis of the case where a plurality of power supply lines providing power of different voltages are all connected to a common power balancing unit (e.g., the power balancing unit 418 of FIG. 4 or 6 to 11) to supply or receive current, the disclosure is not limited thereto. According to an embodiment of the disclosure, a separate power balancing unit (or a power balancing module) may be provided for each power supply line, and in such a case, a current flow may be generated and its voltage may be transformed, for each power balancing unit (or power balancing module). As such, in the case of using separate and individual power balancing units, for example, when distributed power from the power supply line with a voltage of 20 V and the power supply line with a voltage of 5 V is to be provided to the power supply line with a voltage of 9 V, as in the example of FIG. 12, the current from the power supply line with the voltage of 20 V may be provided stepped-down to the voltage of 9 V (e.g., through one power balancing module connected to the power supply line with the voltage of 20 V), and at the same time (not in time-division), the current from the power supply line with the voltage of 5 V may be provided as stepped-up to the voltage of 9V (e.g., through another power balancing module connected to the power supply line with the voltage of 5 V).

Figure 13A:
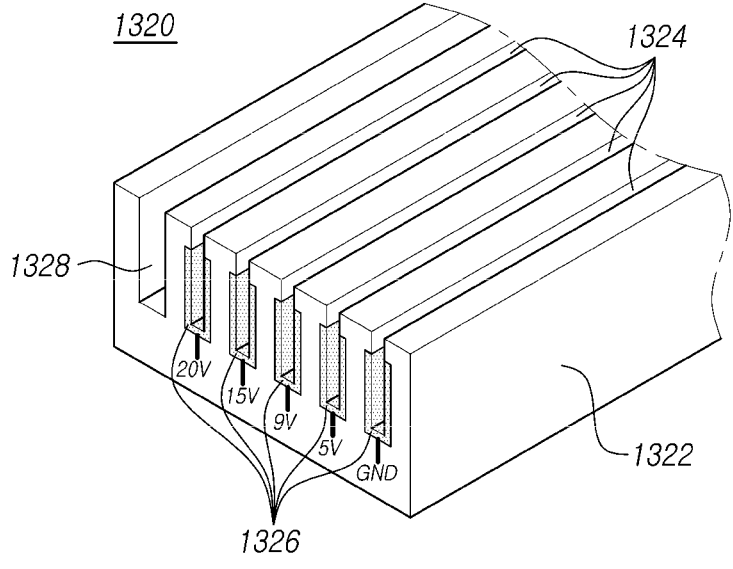
FIG. 13A is a perspective view illustrating a part of an example configuration of a feeding unit, according to various embodiments.
Figure 13B:
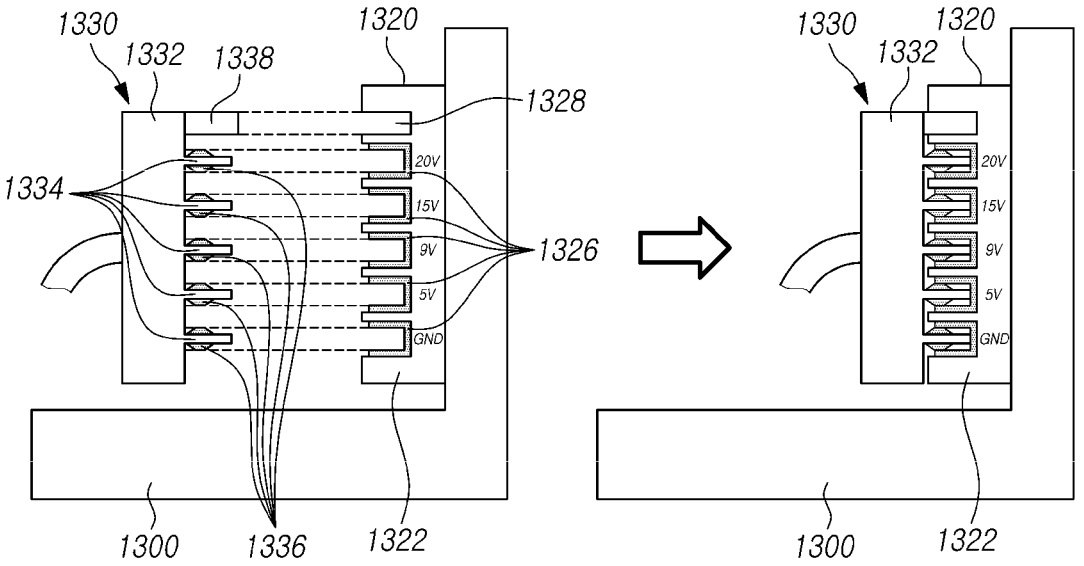
FIG. 13B is a diagram illustrating a side view illustrating a state in which a feeding unit having the configuration of FIG. 13A is installed on a vertical wall and coupled to a corresponding example connector according to various embodiments.

FIG. 13A is a perspective view illustrating a part of an example feeding unit, according to various embodiments, and FIG. 13B is a diagram illustrating a side view illustrating a state in which the feeding unit having the configuration of FIG. 13A is installed on a vertical wall surface (refer to the embodiment of FIG. 2) and coupled to a corresponding example connector according to various embodiments.

According to an embodiment of the disclosure, as illustrated in FIG. 13A, the feeding unit 1320 may have a plurality of grooves 1324 disposed side by side and extending in an insulating member (e.g., including an insulating material) 1322. As illustrated therein, each groove 1324 may be formed in a deep-recessed (e.g., ⊏-shaped) structure that is open upward, and an electrode 1326 may be disposed inside each groove 1324. According to an embodiment of the disclosure, as illustrated in FIG. 13A, each electrode 1326 disposed in each groove 1324 may be, for example, an electrode connected to each of a plurality of power supply lines 150 of FIG. 4, for supplying currents of different voltages (e.g., 20V, 15V, 9V, 5V, and GND), but the disclosure is not limited thereto.

As illustrated, each electrode 1326 may have a deep-recessed structure that is disposed on both sidewalls and the bottom of the groove 1324, conforming to the shape of the corresponding groove 1324, and the disclosure is not limited thereto. According to an embodiment of the disclosure, the electrodes 1326 may have various shapes inclusive of an I-shaped electrode disposed only on one side of both the sidewalls of the corresponding groove 1324 or an L-shaped electrode disposed on either side of both the sidewalls and the bottom of the corresponding groove 1324. In this drawing, each electrode 1326 is illustrated as having the same shape, but the disclosure is not limited thereto. According to an embodiment of the disclosure, the electrodes 1326 may have the same or different shapes. According to an embodiment of the disclosure, as illustrated in FIG. 13A, each electrode 1326 may be positioned inside each groove 1324 formed in the insulating member 1322 and not in contact with the surface of the insulating member 1322, for the purpose of safety. According to an embodiment of the disclosure, as illustrated in FIG. 13A, the insulating member 1322 may further include a guide groove 1328 for guiding a connector to connect to the feeding unit 1320 from the outside.

In this drawing, a plurality of grooves are disposed side by side parallel to each other, but the disclosure is not limited thereto. According to an embodiment of the disclosure, the feeding unit 1320 may have grooves extending along a curved direction while maintaining a certain interval from each other, or may have grooves arranged in various other shapes. In this drawing, it is illustrated that each of the electrodes 1326 is disposed in the corresponding groove 1324, but the disclosure is not limited thereto, and it may be configured such that only some of the electrodes 1326 are disposed in the corresponding groove 1324.

Referring to FIG. 13B, it is illustrated a situation in which the feeding unit 1320 having the configuration of FIG. 13A is attached to a vertical wall surface of the L-shaped shelf 1300, and an example connector 1330 corresponding thereto is connected to the feeding unit 1320. According to an embodiment of the disclosure, as illustrated in FIG. 13B, the connector 1330 may include an insulating member 1332, and a protruding guide 1338 formed on the insulating member 1332 and configured to be inserted into the guide groove 1328 of the feeding unit 1320. According to an embodiment of the disclosure, as illustrated in FIG. 13B, the connector 1330 may also have a plurality of protruding portions 1334 disposed on the insulating member 1332, and may have an electrode portion 1336 disposed on each protruding portion 1334.

The shape of the example connector 1330 according to an embodiment of the disclosure will be described further with reference to FIGS. 1414A, 14B and 14C. FIG. 14 is a perspective view illustrating an example shape of an example connector (e.g., the example connector 1330 of FIG. 13B), FIG. 14B includes various views of each protruding portion 1334 of the connector 1330 viewed slantingly from above the side surface and vertically from the top of the side surface, respectively, according to various embodiments, and FIG. 14C is a cross-sectional view of a protruding portion 1334 taken along line I-f shown in FIG. 14B according to various embodiments.

Figure 14A:
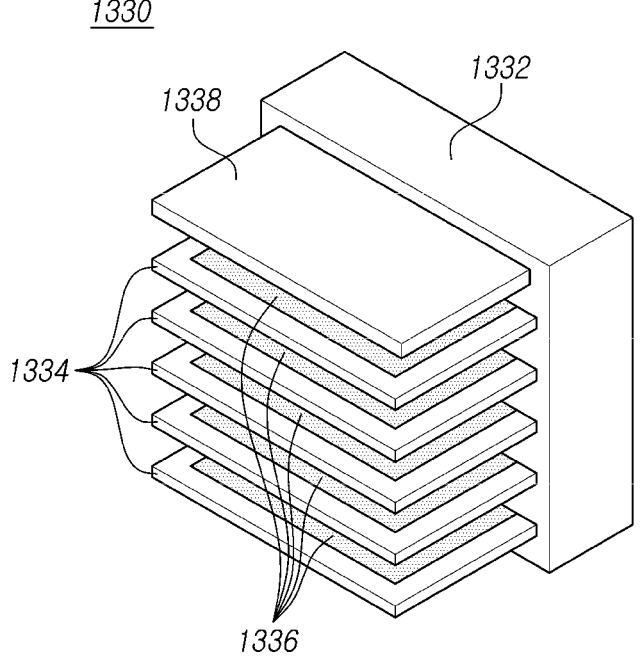
FIG. 14A is a perspective view illustrating a shape of an example connector according to various embodiments.
Figure 14B:
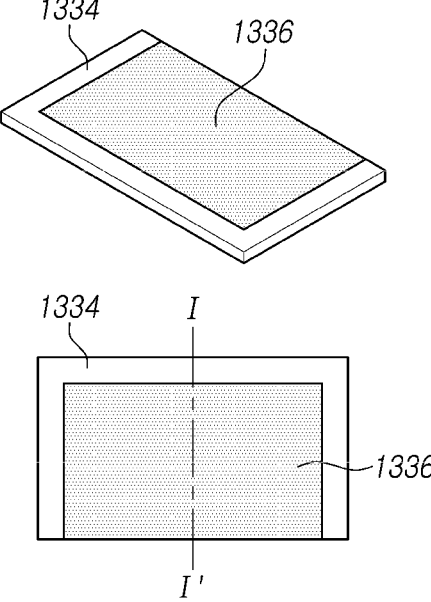
FIG. 14B includes various views of each protruding portion of the connector of FIG. 14A viewed slantingly from above the side surface and vertically from a top of the side surface, respectively according to various embodiments.
Figure 14C:
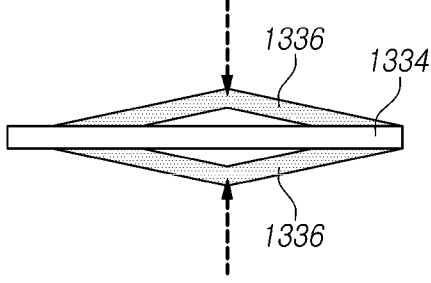
FIG. 14C is a cross-sectional view of a protruding portion taken along line I-f shown in FIG. 14B according to various embodiments.

As illustrated in FIG. 13B and FIGS. 14A, 14B and 14C, the connector 1330 may have a plurality of protruding portions 1334 horizontally protruding from one surface of the insulating member 1332 and arranged to be spaced apart from each other and stacked in parallel, and may have electrodes 1336 disposed on a top surface and a bottom surface of each protruding portion 1334 in the stacked direction. According to an embodiment of the disclosure, as illustrated in FIG. 14C, each electrode portion 1336 of the connector 1330 may be disposed on each of the top surface and the bottom surface of the corresponding protruding portion 1334, wherein the electrode portion 1336 may be formed beveled to slightly protrude upward or downward from each of the top surface or the bottom surface toward an intermediate part of the protruding portion 1334 (e.g., a middle portion in between the position where the insertion begins and the position where the insertion ends, along a direction in which the protruding portion 1334 is inserted into the groove 1324, as shown in FIG. 13B). As illustrated in FIG. 14C, the electrode portion 1336 is formed to protrude toward the middle portion of the protruding portion 1334, forming substantially a triangle shape with respect to each of the top surface and the bottom surface of the protruding portion as illustrated in the cross-section of FIG. 14C. According to an embodiment of the disclosure, when the electrode portion 1336 of the connector 1330 is configured as described above, elasticity may be generated in the direction of the arrow shown in FIG. 14C. Thus, when the protruding portion 1334 of the connector 1330 is inserted into the corresponding groove 1324 of the feeding unit 1320, a natural insertion may be achieved, and electrical connection between the corresponding electrode portions 1336 and the electrodes 1326 may be facilitated. In this drawing, each of the electrode portions 1336 disposed on each of the top surface and the bottom surface of the protruding portion 1334 is illustrated to have an inclined shape, but the disclosure is not limited thereto. According to an embodiment of the disclosure, the electrode portions 1336 may not have such an inclined configuration as described above, or may have such an inclined configuration only on either one of the top surface and the bottom surface of the protruding portion 1334.

Referring to FIG. 13B, it is illustrated that when the connector 1330 is connected to the feeding unit 1320, the protrusion guide 1338 of the connector 1330 is inserted into the guide groove 1328 of the feeding unit 1320, and at the same time, each protruding portion 1334 of the connector 1330 is inserted into each corresponding groove 1324 of the feeding unit 1320, so that each electrode portion 1336 of the connector 1330 is connected to each electrode 1326 of the corresponding feeding unit 1320.

According to an embodiment of the disclosure, the insulating member 1322 of the feeding unit 1320 may be made of a predetermined rigid material. When the protruding portion 1334 of the connector 1330 is inserted into the groove 1324 of the feeding unit 1320, the insulating member 1322 with elasticity may be bent toward the protruding portion 1334 inserted into the corresponding groove 1324. As such, in another groove adjacent to the corresponding groove 1324, the gap between both sidewalls may be widened, and due to such a change in the gap, electrical connection may be defective in the other groove adjacent thereto. According to an embodiment of the disclosure, when the insulating member 1322 is made of a rigid material, the insertion of the protruding portion 1334 of the connector 1330 into any one of the grooves of the feeding unit 1320 may eliminate the possibility that the insertion of the protruding portion 1334 may result in poor electrical connectivity to other grooves neighboring the corresponding groove.

Meanwhile, the connector 1330 illustrated in FIG. 13B and FIG. 14A is illustrated as having protruding portions 1334 (and corresponding electrodes 1336) corresponding to all grooves 1324 (and corresponding electrodes 1326) of the feeding unit 1320, and it is only for convenience of description. According to various embodiments of the disclosure, each connector may have various modified shapes. For example, according to an embodiment of the disclosure, unlike those illustrated in FIG. 13B and FIG. 14A, the connector may be configured to have a limited number of protruding portions and corresponding electrodes to receive only power of a required voltage. According to an embodiment of the disclosure, the connector may include an electrode selection switch inside the connector, which is not illustrated in FIGS. 13B and 14A.

Figure 15A:
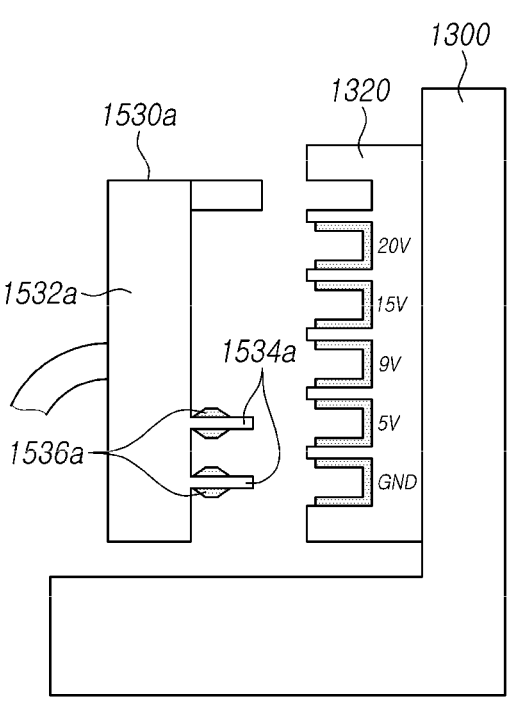
FIGS. 15A, 15B and 15C are diagrams illustrating example structures of example connectors according to various embodiments.
Figure 15B:
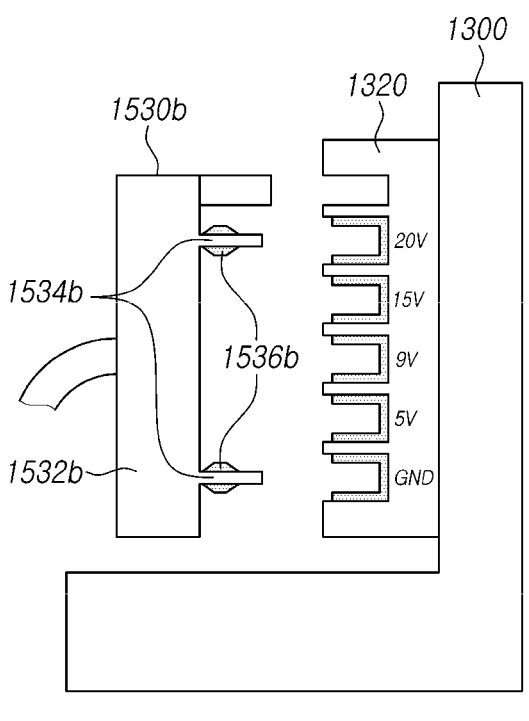
Figure 15C:
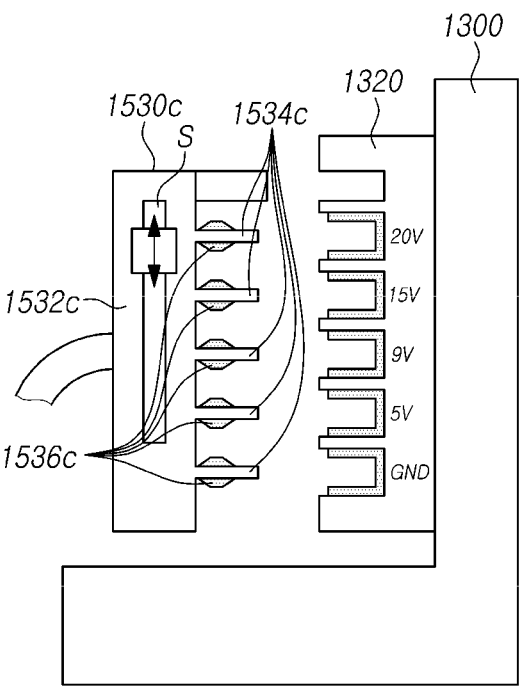

In this connection, FIGS. 15A, 15B and 15C illustrate three example configurations of the connector according to various embodiments, respectively. The connectors (1530*a*, 1530*b*, 1530*c*) each illustrated in FIGS. 15A, 15B and 15C have the structure that is generally similar to that of the connector 1330 illustrated in FIG. 13B or FIG. 14A, although different from the connector 1330 described above in that they are configured to receive only power of each corresponding voltage. In order to easily understand the connection structure of the feeding units of the connectors (1530*a*, 1530*b*, 1530*c*) illustrated in FIGS. 15A, 15B and 15C, it should be noted that the feeding unit 1320 attached to the vertical wall surface of the L-shaped shelf 1300 illustrated in FIG. 13B is illustrated together.

The connector 1530*a* illustrated in FIG. 15A has two protruding portions 1534*a* corresponding to the lowermost two groove positions of the feeding unit 1320 and electrode portions 1536*a* disposed thereon. Accordingly, when the connector 1530*a* is connected to the feeding unit 1320, the connector 1530*a* may be connected to only the lowermost two electrodes of the feeding unit 1320, that is, a 5V voltage electrode and the GND electrode, and may receive power of the 5V voltage via the two electrodes. In short, the connector 1530*a* illustrated in FIG. 15A may be a connector for receiving power of the 5V voltage.

The connector 1530*b* illustrated in FIG. 15B has two protruding portions 1534*b* corresponding to the uppermost and lowermost positions of the feeding unit 1320 and electrode portions 1536*b* disposed thereon, respectively. As such, when the connector 1530*b* is connected to the feeding unit 1320, the connector 1530*b* may be connected to only two electrodes at the top and bottom positions of the feeding unit 1320, that is, a 20V voltage electrode and a GND electrode, and may receive power of a voltage of 20V from the two electrodes. In short, the connector 1530*b* illustrated in FIG. 15B may be a connector for receiving power of the voltage of 20V.

The connector 1530*c* illustrated in FIG. 15C has protruding portions 1534*c* corresponding to respective grooves of the feeding unit 1320 and electrode portions 1536*c* disposed therein. However, the connector 1530*c* illustrated in FIG. 15C may include a voltage selection switch S to select a desired voltage. As such, when the connector 1530*c* is connected to the feeding unit 1320, the voltage selection switch S may be operated to select an electrode providing a desired voltage from among the electrodes of the feeding unit 1320. In short, the connector 1530*c* illustrated in FIG. 15C may be referred to as a voltage selective connector. Meanwhile, these drawings and the related description thereof are merely of an example for helping understanding of the present disclosure, and it should be noted that connectors of various other shapes and structures may be used according to various embodiments of the disclosure.

Figure 16A:
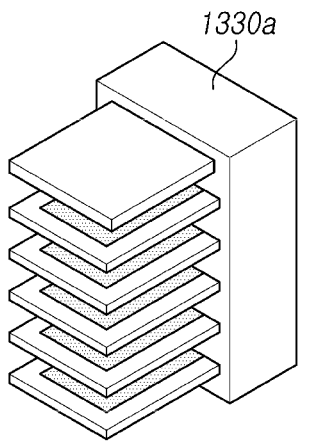
FIGS. 16A, 16B, 16C and 16D are perspective views illustrating various types of example connectors, according to various embodiments.
Figure 16B:
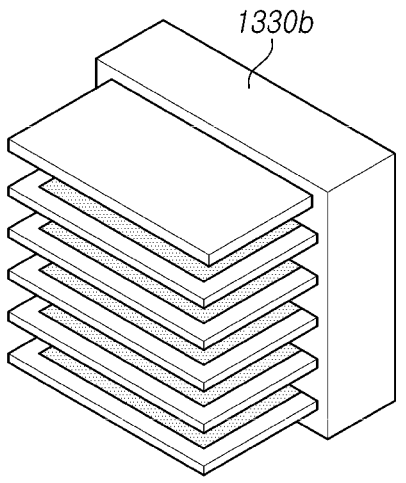
Figure 16C:
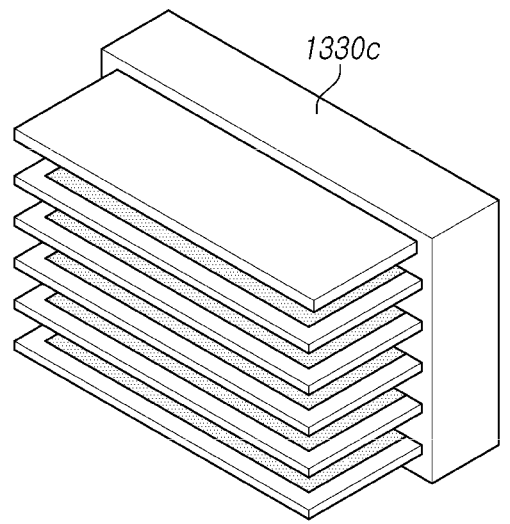
Figure 16D:
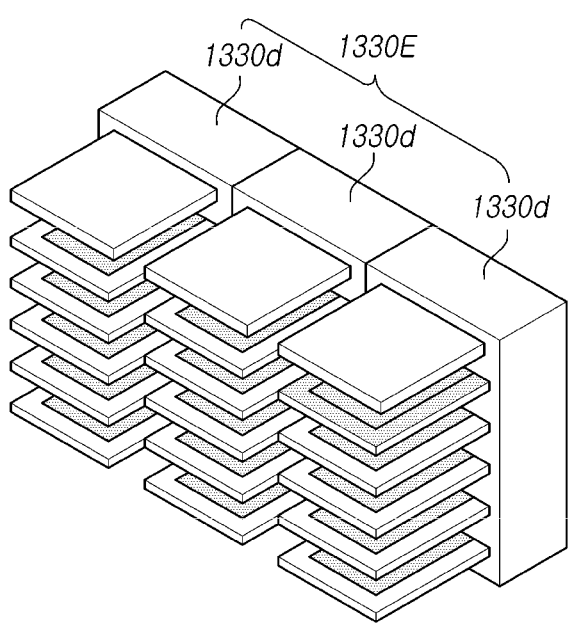

FIGS. 16A, 16B, 16C and 16D are perspective views illustrating various types of example connectors according to various embodiments. The connectors (1330*a*, 1330*b*, 1330*c*) illustrated in FIGS. 16A, 16B and 16C may have substantially the same shape and structure as the connector 1330 illustrated in FIG. 14A, but may differ in that the respective planes of the protruding portions of the connectors (1330*a*, 1330*b*, 1330*c*) and the areas of the electrodes disposed therein are different from each other. Typically, as the electrode receives a larger amount of power, more current flows through the electrode, and as more current flows, more loss and heat in the electrode may generate due to its contact resistance. The connectors (1330*a*, 1330*b*, 1330*c*) illustrated in FIGS. 16A, 16B and 16C are intended to demonstrate that the electrode may be configured to have different sizes, taking into account the amount of power that each connector needs to accommodate. Meanwhile, as described above, FIGS. 16A, 16B and 16C illustrate the connectors (1330*a*, 1330*b*, 1330*c*) integrally formed with different size of electrodes for each power capacity, whereas FIG. 16D illustrates an expanded type of connector 1330E in which a plurality of a basic type of connectors 1330*d* (e.g., three in this illustration) each having a predetermined dimension of protruding portions and electrodes are arranged in parallel with each other.

Figure 17:
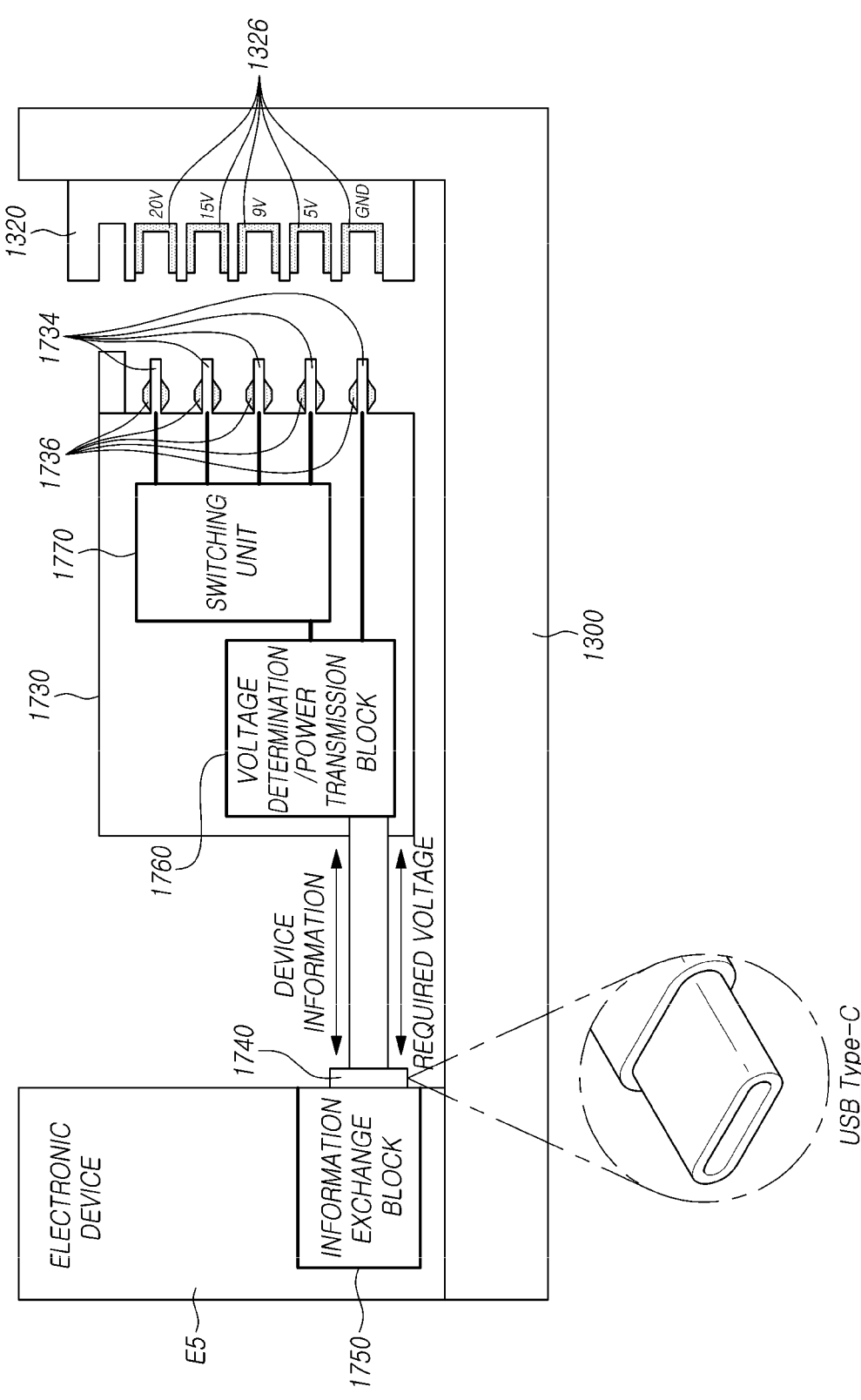
FIG. 17 is a diagram illustrating a connection relationship in which a USB PD connector supporting a variable voltage connects a feeding unit and an electronic device, according to various embodiments.

FIG. 17 is a diagram illustrating an example connection relationship in which a USB PD connector supporting a variable voltage connects a feeding unit and an electronic device, according to various embodiments.

As illustrated in FIG. 17, the feeding unit 1320 as illustrated in FIG. 13B is attached to the vertical wall surface of the L-shaped shelf 1300, and an electronic device E5 is placed on the L-shaped shelf 1300. As illustrated, the electronic device E5 may have a USB port 1740 (e.g., a USB Type-C port) and may be connected to the connector 1730 through the USB port 1740. The electronic device E5 may include an information exchange block 1750 coupled to the USB port 1740. The connector 1730 may include a voltage determination/power transmission block 1760 and a switching unit 1770 therein. Referring to FIG. 17, the connector 1730 includes a plurality of protruding portions 1734 and an electrode portion 1736 disposed on each of the protruding portions 1734. Referring to FIG. 17, each electrode portion 1736 disposed in each protruding portion 1734 may be connected to each electrode 1326 disposed in each corresponding groove of the feeding unit 1320, when the connector 1730 is connected to the feeding unit 1320. Further, as illustrated in FIG. 17, among the electrode portions 1736 disposed in each of the protruding portions 1734, an electrode (e.g., an electrode to be connected to the ground electrode GND of the feeding unit 1320) disposed in the protruding portion disposed at the lowermost part is connected to the voltage determination/power transmission block 1760, and the other remaining electrodes are configured to be selectively connected to the voltage determination/power transmission block 1760 through the switching unit 1770.

In connection with the operation, when the connector 1730 is connected to the electronic device E5, the voltage determination/power transmission block 1760 of the connector 1730 shown in FIG. 17 may identify a required voltage of the electronic device E5 through communication with the information exchange block 1750 of the electronic device E5 according to a certain protocol. Then, the voltage determination/power transmission block 1760 may generate a related control signal and transmit the control signal to the switching unit 1770. The switching unit 1770 may select one electrode (e.g., an electrode at a corresponding position for receiving the required voltage) from among the plurality of electrodes connected to the switching unit 1770, based on the control signal, and may perform a switching operation in the circuit to supply power from the selected electrode. The connector 1730 may be referred to as a USB PD connector that identifies a corresponding voltage from the electronic device E5 and operates to receive a variable voltage (e.g., 20V, 15V, 9V, or 5V) according to the identified information.

Figure 18A:
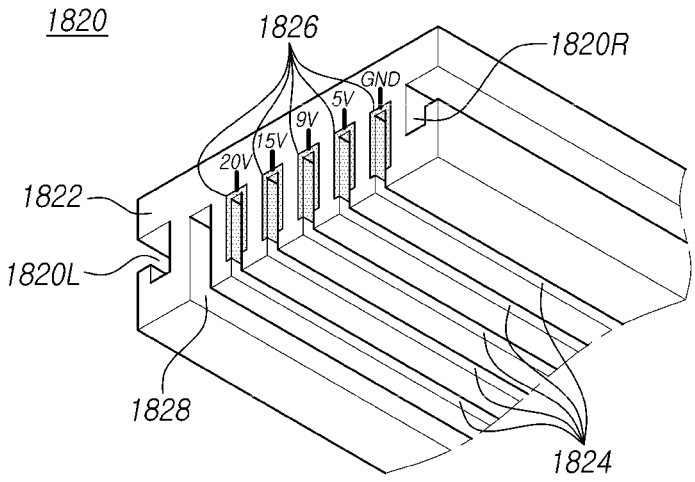
FIG. 18A is a perspective view illustrating an example of partial configuration of a feeding unit viewed upwardly from the bottom, according to various embodiments.
Figure 18B:
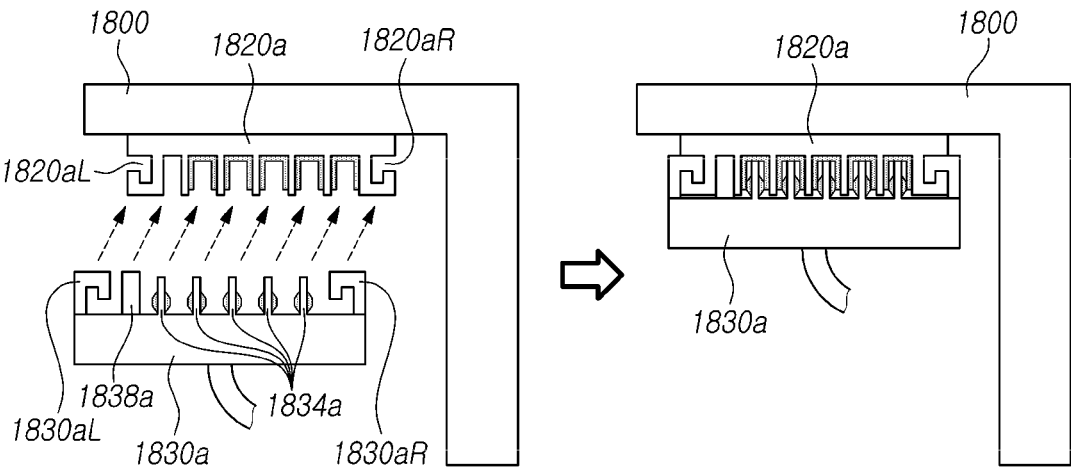
FIG. 18B is a diagram illustrating a side view in a state in which the feeding unit having the configuration of FIG. 18A is installed on a ceiling surface and coupled to a corresponding example connector according to various embodiments.
Figure 18C:
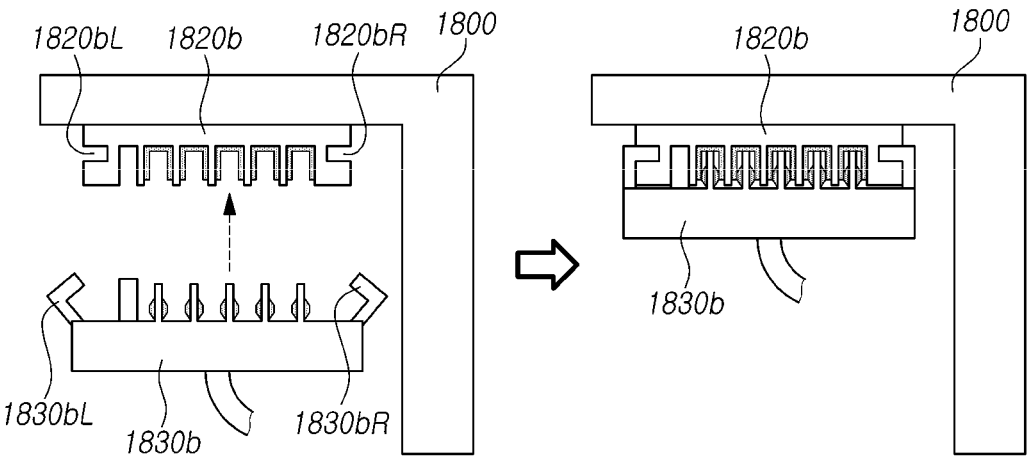
FIG. 18C is a diagram illustrating a side view in a state in which a feeding unit having a configuration modified from FIG. 18A is installed on a ceiling surface and coupled to a corresponding example connector according to various embodiments.

FIG. 18A is a perspective view illustrating an example partial configuration of a feeding unit viewed upwardly from the bottom, according to various embodiments, FIG. 18B is a diagram illustrating a side view illustrating a state in which the feeding unit having the configuration of FIG. 18A is installed on a ceiling surface and coupled to a corresponding example connector according to various embodiments, and FIG. 18C is a diagram illustrating a side view illustrating a state in which a feeding unit having a configuration modified from FIG. 18A is installed on the ceiling surface and coupled to a corresponding example connector according to various embodiments.

Referring to FIG. 18A, the feeding unit 1820 includes an insulating member 1822, a plurality of grooves 1824 formed on the insulating member 1822, a plurality of electrodes 1826 each disposed in each of the plurality of grooves 1824, and a guide groove 1828 for guiding connection of a connector. The feeding unit 1820 illustrated in FIG. 18A has a configuration that is generally similar to the shape in which the feeding unit 1320 illustrated in FIG. 13A is inverted upside down, but differs in that it has latch-shaped support structures (1820L, 1820R) on the outside of the guide groove 1828 and the outside of the groove 1824 for the ground electrode, that is, on the outermost sides of both sides, for connection and supporting of a connector to be described in greater detail below. The feeding unit 1820 illustrated in FIG. 18A may be installed, in use, on a ceiling surface, for example, as illustrated in FIG. 18B.

According to the illustration in FIG. 18B, it is illustrated a situation that the feeding unit 1820 having the configuration of FIG. 18A is attached to the ceiling surface 1800, and an example connector 1830a corresponding thereto is connected to the feeding unit 1820a. Similarly to FIG. 13B, according to an embodiment of the disclosure, when the connector 1830a is connected to the feeding unit 1820a, the protruding guide portion 1838a and the protruding portion

1834a of the connector 1830a may be inserted into the guide groove and the corresponding groove of the feeding unit 1820a. As illustrated in FIG. 18B, the connector 1830a may have fastening structures 1830aL and 1830aR at outermost positions with respect to both sides of the protrusion guide portion 1838a and the protruding portion 1834a. Referring to FIG. 18B, each of the fastening structures 1830aL and 1830aR of the connector 1830a may have a hook shape corresponding to the latch-shaped support structures 1820L and 1820R of the feeding unit 1820a, and may be fastened to each of the support structures 1820aL and 1820aR provided in the feeding unit 1820a, when the connector 1830a is connected to the feeding unit 1820a installed on the ceiling surface 1800. According to an embodiment of the disclosure, when the connector 1830a is connected to the feeding unit 1820a, with the structure as illustrated in FIG. 18B, the fastening structures 1830aL and 1830aR of the connector 1830a are hooked, at one end of the feeding unit 1820a, to the support structure 1820aL and 1820aR of the feeding unit 1820a, thereby slidably moving the connector 1830a to a desired position in the feeding unit 1820a. As such, as the support structures 1820aL and 1820aR of the feeding unit 1820 are respectively coupled to the fastening structures 1830aL and 1830aR of the connector 1830a, a force in the direction of gravity with respect to the connector 1830a may be supported.

Referring to FIG. 18C, the overall illustration is similar to that shown in FIG. 18B. That is, as illustrated in FIG. 18B, FIG. 18C also illustrates a situation in which the feeding unit 1820b is attached to the ceiling surface 1800 and the corresponding example connector 1830b is connected to the feeding unit 1820b. However, in the feeding unit 1820b illustrated in FIG. 18C, the support structures 1820bL and 1820bR provided at the outermost side thereof have a shape different from the support structures 1820aL and 1820aR of the feeding unit 1820a illustrated in FIG. 18(b), for example, a recessed shape concave from the side surface instead of the latched shape shown in FIG. 18B. Further, the fastening structures 1830bL and 1830bR provided in the connector 1830b illustrated in FIG. 18C have a shape different from the fastening structures 1830aL and 1830aR of the connector 1830a illustrated in FIG. 18B, for example, a shape of elastic tongs corresponding to the support structures 1820bL and 1820bR of the feeding unit 1820b instead of the hook shape of FIG. 18B. According to an embodiment of the disclosure, when the connector 1830b is connected to the feeding unit 1820b having the structure as shown in FIG. 18C, the fastening structures 1830bL and 1830bR of the connector 1830b may be directly attached to the support structures 1820bL and 1820bR of the feeding unit 1820b, using their elasticity, at a desired position in the feeding unit 1820b. It is to be noted that FIGS. 18A, 18B and 18C are merely of examples of use according to various embodiments of the disclosure, and the disclosure is not limited thereto.

Figure 19A:
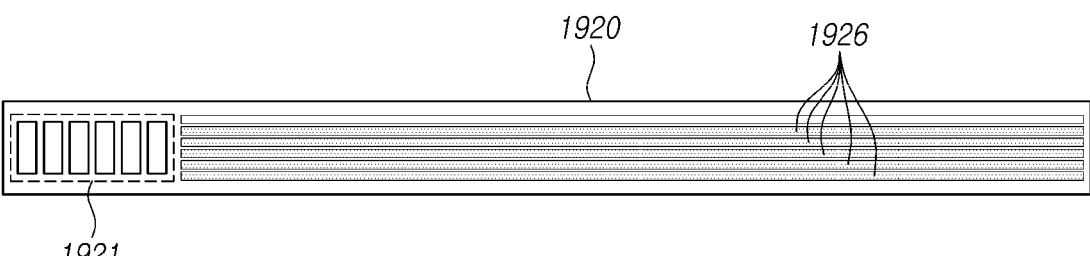
FIGS. 19A, 19B and 19C are diagrams illustrating examples of a feeding unit having a display unit and an operation state of the display unit, according to various embodiments.
Figure 19B:
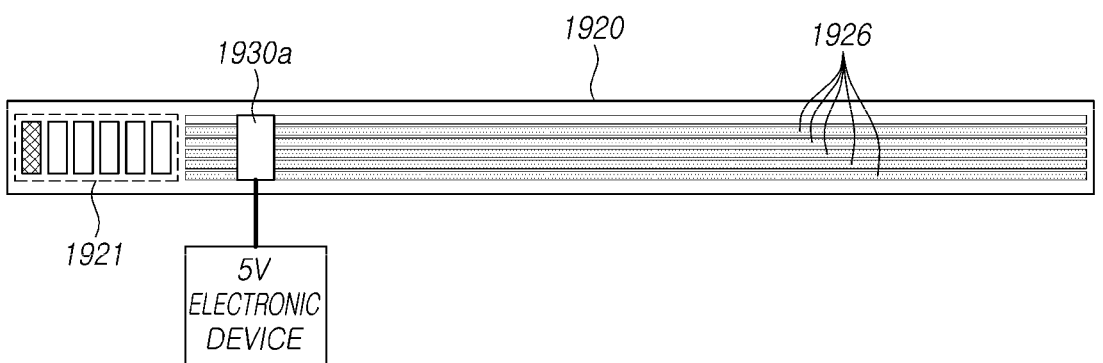
Figure 19C:
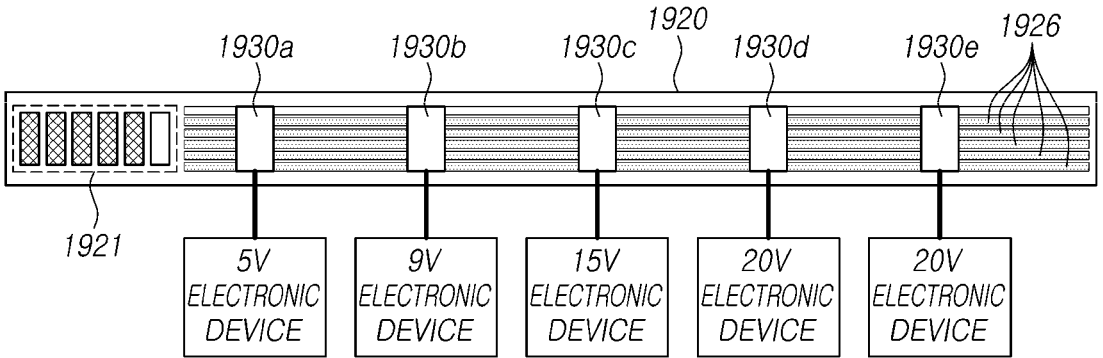

Each of FIGS. 19A, 19B and 19C illustrates by way of example a configuration of a feeding unit having a display unit and an operation state of the display unit according to various embodiments. Referring to FIGS. 19A, 19B, and 19C, the feeding unit 1920 is illustrated as including five electrodes 1926 arranged parallel to each other. According to various embodiments of the disclosure, although not specified in the drawings, the feeding unit 1920 may include a plurality of grooves, and each electrode 1926 may be disposed in each corresponding groove. Referring to FIGS. 19A, 19B and 19C, the feeding unit 1920 may include a display unit 1921 at a position spaced apart from the electrodes 1926.

According to various embodiments of the disclosure, one or more connectors (1930*a*, 1930*b*, 1930*c*, 1930*d*, 1930*e*) may be used to freely add or remove connection to/from the feeding unit 1920, and thus, whenever the connectors connected to the feeding unit 1920 are changed, the total amount of power usage provided through the feeding unit 1920 may change. As described above with reference to FIG. 4, according to an embodiment of the disclosure, the power balancing control unit 416 of the power supply 110 may obtain the total amount of power usage provided through the feeding unit 120 to provide information about the total amount of power usage (e.g., the total amount of power usage or information on the ratio of the total amount of power usage to the maximum amount of power supply of the power adapter) to the feeding unit 120. According to an embodiment of the disclosure, as described above, the feeding unit 120 may externally display information related to the total amount of power usage obtained from the power balancing control unit 416 through the display unit 1921 provided in the feeding unit 120 to the outside.

According to an embodiment of the disclosure, the display unit 1921 may include, for example, an array of a plurality of LED lamps. According to an embodiment of the disclosure, the visual display unit 1921 may include various types of display devices inclusive of various light emitting device arrays, LCD, LED or OLED screens, or the like capable of displaying the total amount of power usage with numerical values, texts, pictures, and any other various recognizable means, and the disclosure is not limited to a specific type of display.

Referring to FIGS. 19A, 19B and 19C, for example, the display unit 1921 may include six LED lamps. In FIG. 19A, there is no connector being connected, and thus none of the lamps of the visual display unit 1921 are turned ON. In FIG. 19B, one connector for an electronic device of 5V voltage is connected, wherein only one of those six LED lamps is lit on the visual display unit 1921. Accordingly, the user may intuitively recognize that one sixth of the maximum amount of total power supply that may be provided by the power feeding unit 1920 is currently being consumed. Meanwhile, in FIG. 19C, a total of five connectors for electronic devices of 5V, 9V, 15V, 20V, and 20V voltages are connected, wherein five of the total six LED lamps are lit on the visual display unit 1921. Thus, the user may intuitively recognize that five-sixths of the maximum total power supply that may be provided through the power feeding unit 1920 is currently being consumed, and may be able to refer to that information when seeking to further utilize a new connector.

Heretofore, various embodiments of the disclosure have been described with respect to the power adapter configured to supply electric power to an external device via connectors connected from the outside, but the disclosure is not limited thereto. It is to be appreciated that the present disclosure may be also applicable to various a built-in or external type of power devices configured to supply power of a plurality of voltages to a plurality of devices or components.

The terms used herein are used merely to describe various example embodiments and are not intended to limit the present disclosure thereto. For example, a component expressed in the singular is to be understood as including a plurality of components unless the context clearly indicates a singular meaning. As used in this disclosure, the term "and/or" is to be understood to encompass all possible combinations of one or more of the enumerated items. As used in the disclosure, the terms "comprise(s)", "have/has", "include(s)", "consist(s) of", and the like are intended only to designate the presence of features, components, parts, or combinations thereof described in the disclosure, and the use of such terms is not intended to exclude the possibility of presence or addition of one or more other features, components, parts, or combinations thereof. As used herein, the expressions "first", "second", and the like may refer to various components, regardless of order and/or importance, and are only used to distinguish one component from another and are not intended to limit such components.

As used herein, the expression 'configured to ~' may be used interchangeably with, depending on the context, for example, 'suitable for ~', 'having the ability to ~', 'designed to ~', 'modified to ~', 'made to ~', 'capable of ~' or the like. The term 'configured to ~' may not necessarily refer only to 'specially designed to ~' in hardware. Instead, in various situations, the expression 'a device configured to ~' may refer, for example, to the device being 'capable of ~' together with another device or component. For example, a phrase 'a device configured (or set) to perform A, B, and C' may imply a dedicated device for performing a corresponding operation or imply a general-purpose device capable of performing various operations including the corresponding operation.

Although the foregoing description in the disclosure has been made on the basis of specific embodiments, the disclosure is not limited to such specific embodiments, and it should be understood that it encompasses any and all various modifications, equivalents, and/or substitutes of various embodiments. It will also be understood that any of the embodiment(s) described herein may be used in conjunction with any other embodiment(s) described herein.

What is claimed is:

1. A power supply, comprising:
   a plurality of power supply lines respectively configured to transmit power of a plurality of voltages, each of the plurality of power supply lines having a corresponding danger threshold power amount and a corresponding upper-limit threshold power amount;
   a power balancing control unit comprising circuitry configured to:
      obtain each amount of power usage for each of the plurality of power supply lines and generate a control signal based on each of the obtained amounts of power usages;
      determine at least one power supply line among the plurality of power supply lines as a first power supply line by:
         for each of the plurality of power supply lines, calculating an amount of available power for that power supply line as a difference between the obtained amount of power usage for that power supply line and the upper-limit threshold power amount for that power supply line; and
         comparing the amount of available power for each of the plurality of power supply lines with the amount of available power for the others of the plurality of power supply lines, the amount of available power of the first power supply line being higher than the others of the plurality of power supply lines; and
      determine one power supply line among the plurality of power supply lines as a second power supply line, based on a difference between the obtained amount of power usage and the danger threshold power amount for the one power supply line; and
   a power balancing unit comprising circuitry configured to:
      transform, based on the control signal, a voltage of a current drawn from the first power supply line of the plurality of power supply lines and provide the transformed voltage to the second power supply line of the plurality of power supply lines.

2. The power supply of claim 1, wherein the power balancing unit comprises:

a first switch unit comprising circuitry configured to be connected to each of the plurality of power supply lines to select one of the first power supply line and the second power supply line, a second switch unit comprising circuitry configured to be connected to each of the plurality of power supply lines to select another one of the first power supply line and the second power supply line, and a transformer unit comprising a transformer configured to selectively perform a voltage step-up or a voltage step-down, between the first switch unit and the second switch unit.

3. The power supply of claim 2, wherein the power balancing control unit is configured to:

select the first power supply line and the second power supply line, based on the obtained amounts of power usages;

based on a voltage of the first power supply line being higher than a voltage of the second power supply line, generate a first operation control signal to control the first switch unit to select the first power supply line, the second switch unit to select the second power supply line, and the transformer unit to perform the voltage step-down; and based on a voltage of the first power supply line being lower than the voltage of the second power supply line, generate a second operation control signal to control the first switch unit to select the second power supply line, the second switch unit to select the first power supply line, and the transformer unit to perform the voltage step-up.

4. The power supply of claim 1, wherein the power balancing unit is further configured to:

if there are multiple first power supply lines, draw a current from each of the multiple first power supply lines, in a sequential and alternating manner, and perform a voltage step-up or a voltage step-down for each drawn current to provide the resultant voltage to the second power supply line.

5. The power supply of claim 1, wherein the power balancing unit comprises one or more power balancing modules, and wherein each of the power balancing modules comprises:

a transformer unit comprising a transformer configured to have one end connected to one power supply line of the plurality of power supply lines and selectively perform a voltage step-up or a voltage step down, and a switch unit comprising circuitry configured to be connected to another end of the transformer unit at one side and be connected to two or more power supply lines among other power supply lines other than the one power supply line at other side, so as to select one of the two or more power supply lines.

6. The power supply of claim 1, further comprising a feeding unit comprising a plurality of electrodes configured to transmit currents of the plurality of voltages obtained from the plurality of power supply lines to outside of the power supply, respectively, wherein each of the plurality of electrodes comprises an extended portion so that two or more connectors are allowed to be connected thereto at the same time, the extended portion maintaining a specified distance from those of neighboring electrodes.

7. The power supply of claim 6, wherein the feeding unit comprises a display unit including display circuitry configured to display information indicating a total amount of power being supplied via the plurality of electrodes.

8. The power supply of claim 1, further comprising:

a feeding unit including an insulating member comprising an insulating material having a plurality of grooves, and a plurality of electrodes configured to transmit currents of the plurality of voltages obtained from the plurality of power supply lines to outside of the power supply, respectively;

wherein each of the plurality of grooves extends side by side, while maintaining a specified distance from neighboring grooves; and wherein at least a portion of each of the plurality of electrodes is disposed in a corresponding groove among the plurality of grooves of the insulating member.

9. The power supply of claim 8, wherein each of the plurality of grooves of the insulating member comprise side walls and a bottom portion, and wherein the electrode disposed in the corresponding groove among the plurality of grooves has one of an I-shape, an L-shape, and ⊏-shape.

10. The power supply of claim 8, wherein the plurality of grooves of the insulating member comprises a plurality of electrode grooves, in which a corresponding portion of each of the plurality of electrodes is disposed, and wherein the insulating member:

comprises a guide groove configured to guide connection of a connector to the feeding unit, or includes support configured to support connection of a connector to the electrode, in case of the connector being connected to the electrode, and disposed on one or both outer sides of outermost grooves among the plurality of grooves, or comprises a material having a rigidity wherein, in case of protruding electrode portion of a connector being inserted into the electrode groove corresponding thereto, a spacing between sidewalls of a neighboring electrode groove of the electrode groove is not substantially changed.

11. The power supply of claim 10, wherein a plurality of protruding portions provided in the connector are configured to be inserted into respective corresponding grooves of the plurality of grooves of the insulating member, each of the protruding portions including a flat portion having an upper surface and a lower surface, and an electrode portion disposed on at least one surface of the upper surface and the lower surface, and the plurality of protruding portions being arranged such that the flat portions are stacked side by side with a specified interval, and wherein the electrode portion of one of the plurality of protruding portions of the connector is configured to be electrically connected to the electrode disposed in the corresponding groove, based on selection from the connector.

12. A method for performing power balancing in a power supply, comprising:

obtaining each amount of power usage from each of a plurality of power supply lines, each of the plurality of power supply lines having a corresponding danger threshold power amount and a corresponding upper-limit threshold power amount;

based on each of the obtained amounts of power usages, determining, among the plurality of power supply lines:

at least one first power supply line to provide current to another power supply line by:

for each of the plurality of power supply lines, calculating an amount of available power for that power supply line as a difference between each obtained amount of power usage for that power supply line and the upper-limit threshold power amount for that power supply line; and comparing the amount of available power for each of the plurality of power supply lines with the amount of available power for the others of the plurality of power supply lines, the amount of available power of the at least one first power supply line being higher than the others of the plurality of power supply lines; and a second power supply line to receive current from another power supply line based on a difference between the obtained amount of power usage and the danger threshold power amount for each of the plurality of power supply lines; and controlling at least a portion of available power from each of the at least one first power supply line to be provided to the second power supply line.

13. The method of claim 12, wherein the controlling comprises generating a control signal to selectively perform a voltage step-up or a voltage step-down based on a voltage of the first power supply line and a voltage of the second power supply line, the method further comprising:

drawing a current from the first power supply line, transforming a voltage of the drawn current, based on the control signal, and providing a current of the transformed voltage to the second power supply line.

14. The method of claim 12, further comprising if there are multiple first power supply lines, drawing a current from each of the multiple first power supply lines, in a sequential and alternating manner, and performing a voltage step-up or a voltage step-down for each drawn current to provide the resultant voltage to the second power supply line.

\* \* \* \* \*